US010277728B1

(12) United States Patent
Toren

(10) Patent No.: US 10,277,728 B1
(45) Date of Patent: *Apr. 30, 2019

(54) METHOD AND SYSTEM FOR COMMUNICATION

(71) Applicant: messageLOUD LLC, New York, NY (US)

(72) Inventor: Garin Toren, New York, NY (US)

(73) Assignee: MessageLoud Inc, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/112,587

(22) Filed: Aug. 24, 2018

Related U.S. Application Data

(63) Continuation of application No. 15/421,237, filed on Jan. 31, 2017, now Pat. No. 10,110,725, which is a
(Continued)

(51) Int. Cl.
*H04M 1/00* (2006.01)
*H04M 1/725* (2006.01)
(Continued)

(52) U.S. Cl.
CPC ...... *H04M 1/72547* (2013.01); *G06F 3/0482* (2013.01); *G06F 3/04817* (2013.01);
(Continued)

(58) Field of Classification Search
None
See application file for complete search history.

(56) References Cited

U.S. PATENT DOCUMENTS 8,359,014 B2   1/2013   Olincy et al.
8,526,973 B2   9/2013   Thomson
(Continued)

FOREIGN PATENT DOCUMENTS

EP   2779701   9/2014

OTHER PUBLICATIONS

Google Voice: In the car with Android, Mar. 24, 2014.
(Continued)

*Primary Examiner* — Erika A Washington
(74) *Attorney, Agent, or Firm* — Payam Moradian

(57) ABSTRACT

Provided is a computer implemented method and system for delivering text messages, emails, and messages from a messenger application to a user while the user is engaged in an activity, such as driving, exercising, or working. Typically, the emails and other messages are announced to the user and read aloud without any user input. In Drive Mode, while the user is driving, a clean interface is shown to the user, and the user can hear announcements and messages/emails aloud without looking at the screen of the phone, and use gestures to operate the phone. After a determination is made that a new text message and/or email has arrived, the user is informed aloud of the text message/email/messenger message and in most instances, and if the user takes no further action, the body and/or subject of the text message/email/messenger message is read aloud to the user. All messages can be placed in a single queue, and read to the user in order of receipt.

25 Claims, 37 Drawing Sheets

Related U.S. Application Data continuation of application No. 14/865,561, filed on Sep. 25, 2015, now Pat. No. 9,591,117.

(60) Provisional application No. 62/118,264, filed on Feb. 19, 2015, provisional application No. 62/083,085, filed on Nov. 21, 2014.

(51) Int. Cl.
*G06F 3/16* (2006.01)
*G06F 3/0488* (2013.01)
*G06F 3/0482* (2013.01)
*G06F 3/0481* (2013.01)
*H04L 12/58* (2006.01)

(52) U.S. Cl.
CPC ............ *G06F 3/04883* (2013.01); *G06F 3/16* (2013.01); *H04L 51/24* (2013.01); *H04M 1/72597* (2013.01)

(56) References Cited

U.S. PATENT DOCUMENTS

| | | | |
|---|---|---|---|
| 9,591,117 B1 * | 3/2017 | Toren | H04M 1/6083 |
| 10,110,725 B1 * | 10/2018 | Toren | H04M 1/6083 |
| 2012/0001843 A1 | 1/2012 | Gravino | |
| 2012/0060123 A1 | 3/2012 | Smith | |
| 2014/0004901 A1 | 1/2014 | Korn | |
| 2014/0282127 A1 | 9/2014 | Muresan et al. | |
| 2015/0011203 A1 | 1/2015 | Schrader et al. | |

OTHER PUBLICATIONS

How to have your emails, texts read to you in the car, Jul. 27, 2012.
How to Make Your Smartphone Smarter, Jan. 22, 2014.
5 Ways to Make Smartphone Speak Notifications, SMS and Emails, May 17, 2014.
Non-Patent Literature With Links. Approximately Mar. 00, 2015 (exact date unknown). The current content of the links may not accurately reflect the actual application that was available at the time.

* cited by examiner

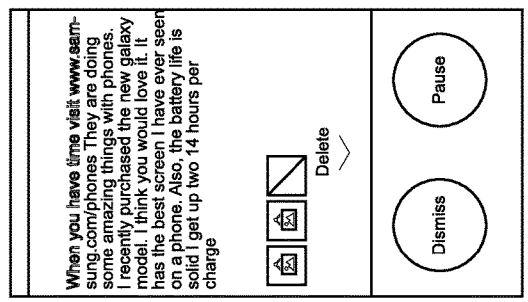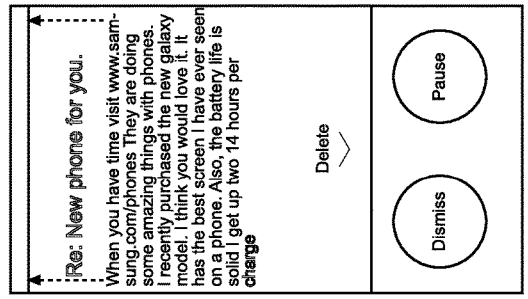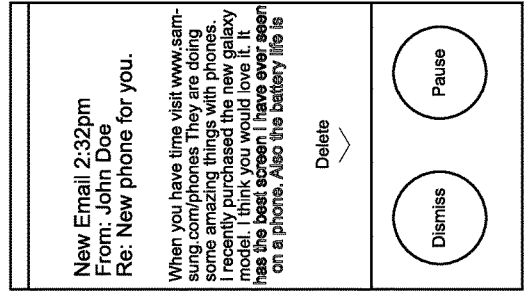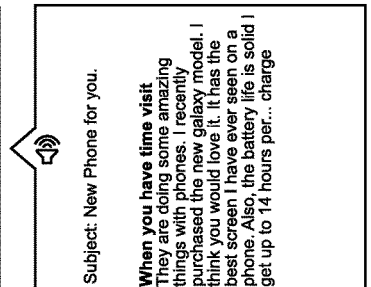
FIG. 2

METHOD AND SYSTEM FOR COMMUNICATION

CROSS REFERENCE

The present application is a continuation of U.S. application Ser. No. 15/421,237, filed on Jan. 31, 2017, which is a continuation of U.S. application. Ser. No. 14/865,561, filed on Sep. 25, 2015, (U.S. Pat. No. 9,591,117) which claims the benefit of U.S. provisional application No. 62/083,085 filed on Nov. 21, 2014, and U.S. provisional application No. 62/118,264 filed on Feb. 19, 2015, both of which are incorporated herein by reference in their entirety.

BACKGROUND SECTION OF THE INVENTION

In today's world, almost everyone has a mobile phone, which is typically put in a pocket or a purse, and used throughout the day.

A person may be engaged in an activity, and cannot use a mobile phone or other devices to receive emails and text messages. For example a person may be driving, and the use of a mobile phone, either for talking or texting, can be hazardous. The person may also be involved in an activity other than driving, in which the person cannot use the mobile phone for receiving emails, texts, and messages/notifications from a messenger application. In addition, the person may receive different types of messages, including emails, text messages, and messages/notifications from a messenger application. While engaged in an activity, the user may not be capable of accessing and reading different types of messages.

US 2013/0275899 proposes a solution for the limited distraction environment by disclosing "a limited-distraction user interface that includes providing for display fewer selectable user interface objects than are displayed in a non-limited user interface for the respective application, and in accordance With a determination that the device is not being operated in a limited distraction context, provides a non-limited user interface for the respective application." However, US 2013/0275899 relies on substantial input from the user even in the limited-distraction context, making it difficult for a user to use a mobile phone in such context.

U.S. Pat. Nos. 8,364,183, 8,526,973, and 8,359,014 disclose "A cell phone which has been modified by the addition of software which responds to the press of one or more Busykeys by automatically sending a pre-typed text message to the sender of the latest text message just received or automatically answering an incoming call immediately upon pressing the Busy key and playing a pro-recorded audio message." However, these patents do not allow a person to respond to a text or a call other than by sending a pre-typed text message and still require substantial input from the user since the user has to choose and press on a Busykey button. For example, while driving a car, a user has to take his or her eyes off the road to find the Busykey button.

There is a need in the art to allow a person to receive emails and other messages while the person is engaged in an activity that limits the person's ability to read emails and other messages.

SUMMARY SECTION OF THE INVENTION

Provided is a computer implemented method to be carried out with a processor, a memory, and a touch screen, comprising: a) determining without any input by a user that a text message, an email, or a message from a messenger application, has arrived while the user is engaged in an activity; b) informing the user without any input by the user that the text message, the email, or the message from the messenger application has arrived from a sender; and c) proceeding with a step selected from the group consisting of (i) and (ii): i) allowing the user time to take an affirmative action to stop reading aloud to the user a body of the text message, the email, or the message from the messenger application; and in accordance with not receiving an input corresponding to the affirmative action from the user, reading aloud the body of the text message, the email, or the message from the messenger application to the user; ii) allowing the user time to take an affirmative action to command reading a body of the text message, the email, or the message from the messenger application aloud to the user; and in accordance with receiving an input corresponding to the affirmative action from the user, reading aloud the body of the text message, the email, or the message from the messenger application to the user. The method can comprise: a) determining without any input by the user that the text message, the email, or the message from the messenger application has arrived while the user is engaged in the activity; b) analyzing without any input by the user a content of the text message, the email, or the message from the messenger application; c) informing the user without any input by the user that the text message, the message from the messenger application, or the email has arrived from a sender by reading aloud an identity of the sender; and d) proceeding with a step selected from the group consisting of (i) and (ii): i) allowing the user time to take an affirmative action to stop reading aloud to the user a body of the text message, the email, or the message from the messenger application; and in accordance with not receiving an input corresponding to the affirmative action from the user, reading aloud the body of the text message, the email, or the message from the messenger application to the user; ii) allowing the user time to take an affirmative action to command reading a body of the text message, the email, or the message from the messenger application aloud to the user; and in accordance with receiving an input corresponding to the affirmative action from the user, reading aloud the body of the text message, the email, or the message from the messenger application to the user. The method can comprise: a) running an application configured to deliver one or more of the email, the text message, or the message from the messenger application to a user while the user is engaged in the activity; b) determining without any input by the user that the text message, the email, or the message from the messenger application has arrived while the application is running; c) analyzing without any input by the user a content of the text message, the email, or the message from the messenger application; d) informing the user without any input by the user that the text message, the email, or the message from the messenger application has arrived from a sender; and; e) proceeding with a step selected from the group consisting of (i) and (ii): i) allowing the user time to take an affirmative action to stop reading aloud to the user a body of the text message, the email, or the message from the messenger application; and in accordance with not receiving an input corresponding to the affirmative action from the user, reading aloud the body of the text message, the email, or the message from the messenger application to the user; ii) allowing the user time to take an affirmative action to command reading a body of the text message, the email, or the message from the messenger application aloud to the user; and in accordance with receiving an input corresponding to the affirmative action from the user, reading aloud the body of the text message, the email, or the message from the messenger application to the user. The method can comprise: a) determining without any input by the user that the text message, the email, or the message from the messenger application has arrived; b) analyzing without any input by the user a content of the text message, the email, or the message from the messenger application; c) informing the user without any input by the user that the text message the email, or the message from the messenger application has arrived from a sender by reading at least aloud identity of the sender; d) allowing the user time to take an affirmative action to stop reading aloud to the user a body of the text message, the email, or the message from the messenger application; and e) in accordance with not receiving an input corresponding to the affirmative action from the user, reading aloud body of the text message, the email, or the message from the messenger application to the user, and in case of the email, further reading aloud a subject of the email. The method can comprise: a) determining without any input by the user that the email has arrived; b) informing the user without any input by the user that the email has arrived from a sender by reading at least aloud identity of the sender; c) allowing the user time to take an affirmative action to stop the application from proceeding to reading aloud a subject and a body of the email; and d) in accordance with not receiving an input corresponding to the affirmative action from the user, reading aloud the subject and the body of the email. The method can comprise: a) running an application configured to deliver the email to the user while the user is engaged in the activity; b) determining without any input by the user that the email has arrived; c) analyzing without any input by the user a content of the email; d) informing the user without any input by the user that the email has arrived from a sender by reading at least aloud identity of the sender; e) allowing the user time to take an affirmative action to stop reading aloud a subject and a body of the email; and f) in accordance with not receiving an input corresponding to the affirmative action from the user, reading aloud the subject and the body of the email. The method can comprise: a) running an application configured to deliver the email to the user while the user is driving a vehicle; b) determining without any input by the user that the email has arrived; c) analyzing without any input by the user a content of the email; d) informing the user without any input by the user that the email has arrived from a sender by reading at least aloud identity of the sender and without displaying information about the sender or the email on the screen; e) allowing the user time to take an affirmative action to stop the application from proceeding to reading aloud a subject and a body of the email, and without displaying information about the sender or the email on the screen; and f) in accordance with not receiving an input corresponding to the affirmative action from the user, reading aloud the subject and the body of the email. The method can comprise: a) determining without any input by the user that the text message or the email has arrived; b) analyzing without any input by the user a content of the text message or the email; c) placing the email or the text message in a queue to be read aloud in order of receipt time, wherein the email and the text message are placed in the same queue and read aloud one after another regardless of whether a next message in the queue is new text message or a new email; d) informing the user without any input by the user that the text message or the email has arrived from a sender by reading at least aloud identity of the sender; e) allowing the user time to take an affirmative action to stop reading a body of the text message or the email aloud to the user; and f) in accordance with not receiving an input corresponding to the affirmative action from the user, reading aloud body of the text message or the email, and in case of the email, further reading aloud a subject of the email. For any of the above methods, the user can receive at least two or more different types messages selected from the group consisting of two or more of the text message, the email, and the message from the messenger application (e.g. Email/text, Email/messenger, messenger/text, email/text/messenger), and the two or more of the text message, the email, and the different types of messages are placed in a queue based on receipt time to be read aloud regardless of the type of the message. For any of the above methods, the step of analyzing parses the email into subject, sender, and body, and parses the text message or the message from the messenger application into sender and body. For any of the above methods, the application can be configured to run in a foreground or in a background, and is further configured to switch back and forth between the foreground and the background, and is further configured to read aloud the identity and the body of the email, text message, or the message from the messenger application while the application is in the background. For any of the above methods, if looking at the screen is hazardous due to the activity, the screen does not display any portion of the email, text message, or message from the messenger application. For Any of the above methods can further comprise prompting to call the sender without any input from the user. Any of the above methods can further comprise a different interface is presented on the screen depending on the activity of the user. Any of the above methods can further comprise informing the user comprises reading aloud a name of the sender. For any of the above methods, step (c) can comprise allowing the user time to take an affirmative action to stop reading of a body of the text message, the email, or the message from the messenger application aloud to the user; and in accordance with not receiving an input corresponding to the affirmative action from the user, reading aloud the body of the text message, or the email to the user. For any of the above methods, step (c) can comprise allowing the user time to take an affirmative action to command reading the text message, the email or the message from the messenger application aloud to the user; and in accordance with receiving an input corresponding to the affirmative action from the user, reading aloud the body of the text message or the email to the user. For any of the above methods can comprise receiving an input from the user without the user looking at the touch screen. Any of the above methods can comprise displaying an interface with no prompts for the user to touch. Any of the above methods can comprise receiving an input from the user based on gestures memorized by the user. For any of the above methods, the input from the user can be limited to tapping or swiping without a need to look at the screen. Any of the above methods can comprise informing the user by voice of an option to call the sender. Any of the above methods can further comprise, in accordance with receiving an input from the user to call the sender, calling the sender. Any of the above methods can comprise informing the user comprises informing the user of the identity of the sender and a subject of the email, or the identity of the sender of the text message or the message from the messenger. Any of the above methods can comprise after reading aloud the email or the text message or the message from the messenger application, the email or the text message or the message from the messenger application is automatically dismissed and a status of the email or the text message or the message from the messenger application is changed to read.

In any of the above methods, after the email, the text message or the message from the messenger application is read aloud and the status changed to read, the user is notified that a new email, text message, or the message from the messenger application in the queue has arrived. Any of the above methods can comprise reading aloud is carried out of an audio system in an automobile. Any of the above methods can comprise limiting the user input to a) pausing or rereading reading of the email or the text message or the message from the messenger application; b) dismissing the email, the text message, or the messenger application; and c) deleting the email; and d) calling the sender. Any of the above methods can comprise the activity being a vehicle. Any of the above methods can comprise the activity being working with a desktop, a laptop, or a tablet computer. Any of the above methods can comprise the activity being an exercise (Active Mode). Any of the above methods, the method can be carried out on a device selected from the group consisting of: a smart phone, a mobile phone, a phablet, a tablet, a wearable device, a watch, and a vehicle operating device. For any of the above methods, the method can only deliver email, or only deliver text messages, or only deliver messages from a messenger application, or deliver all three, or deliver any two combinations thereof (email/text, email/messenger, text/messenger). Any of the above methods can comprise: a) running an application configured to deliver the email to the user while the user is engaged in the activity; b) determining by the application without any input by the user that the email has arrived; c) analyzing by the application without any input by the user a content of the email; d) informing the user by the application without any input by the user that the email has arrived from a sender by sending instructions for reading at least aloud identity of the sender; e) allowing the user time by the application to take an affirmative action to stop reading aloud a subject and a body of the email; and f) in accordance with not receiving an input corresponding to the affirmative action from the user, sending instructions by the application to read aloud a subject and the body of the email.

Provided is a mobile phone, comprising: One or more processors; A memory, One or more programs, wherein the one or more programs are stored in the memory and configured to be executed by the one or more processors, the one or more programs including instructions for the steps comprising (including any of the methods above): a) determining without any input by the user that a text message, an mail, or a message from the messenger application has arrived while the user is engaged in an activity; b) analyzing without any input by the user a content of the text message, the email, or the message from the messenger application; c) informing the user without any input by the user that the text message, the email, or the message from the messenger application message has arrived from a sender by reading at least aloud an identity of the sender; d) allowing the user time to take an affirmative action to stop the application from proceeding to reading a body of the text message, the email, or message from the messenger application aloud to the user; f) in accordance with not receiving an input corresponding to the affirmative action from the user, reading aloud body of the text message, the email, or the message from the messenger application to the user.

Provided is a system for delivering one or more of a message and an email to a user engaged in an activity, the system comprising a processor, a memory, and a touch screen, the system configured to deliver a messages and an email to the user by (including any of the methods above): a) running an application configured to deliver one or more of a text message, an email, or the message from the messenger application to a user while the user is engaged in an activity; b) determining without any input by the user that the text message, the email, or the message from the messenger application has arrived while the application is running; c) analyzing without any input by the user a content of the text message, the email, or the message from the messenger application; d) informing the user without any input by the user that the text message, the email, or the message from the messenger application has arrived from a sender by reading at least aloud an identity of the sender; e) allowing the user time to take an affirmative action to stop the application from proceeding to reading a body of the text message, the email, or the message from the messenger application aloud to the user; and f) in accordance with not receiving an input corresponding to the affirmative action from the user, reading aloud body of the text message, the email, or the message from the messenger application to the user. Any of the above methods can comprise: a) running an application configured to deliver the email to the user while the user is engaged in the activity; b) determining by the application without any input by the user that the email has arrived; c) analyzing by the application without any input by the user a content of the email; d) informing the user by the application without any input by the user that the email has arrived from a sender by sending instructions for reading at least aloud identity of the sender; e) allowing the user time by the application to take an affirmative action to stop reading aloud a subject and a body of the email; and f) in accordance with not receiving an input corresponding to the affirmative action from the user, sending instructions by the application to read aloud a subject and the body of the email.

Provided is a system comprising a processor, a memory, and a touch screen, the system configured to deliver one or more of a text message, an email, or a message from the messenger application to a user while the user is engaged in an activity, the system further comprising: a) a queue notification module for placing the text message, the email, or the message from the messenger application in a queue for posting, wherein a single queue is used for the text message, the email, or the message from the messenger application; b) an analyzer module for analyzing without any input by the user a content of the text message, the email, or the message from the messenger application; and c) a text to speech module configured for: i) informing the user by voice without any input by the user that the text message or the email message has arrived from a sender by sending instructions to a speaker to read at least aloud an identity of the sender; ii) in accordance with not receiving an input corresponding to the affirmative action from the user, sending instructions to a speaker to read aloud body the text message or the email to the user.

Provided is a non-transitory computer readable storage medium storing one or more programs, the one or more programs comprising instructions, which when executed by an electronic device having one or more processors and memory, causes the device to carry out any of the above described methods.

BRIEF DESCRIPTION OF THE FIGURES

FIG. 2 illustrates special cases where the incoming email is relatively long and will not fit on the screen.

DETAILED DESCRIPTION OF THE INVENTION

The present invention provides a method and a system for allowing a user to receive text messages, emails (electronic mail), or messages from a messenger application while the user is engaged in an activity. The user does not need look at the mobile phone while driving or doing other activities, and yet has the capability to fully review messages and even call back the sender.

Figure 1:
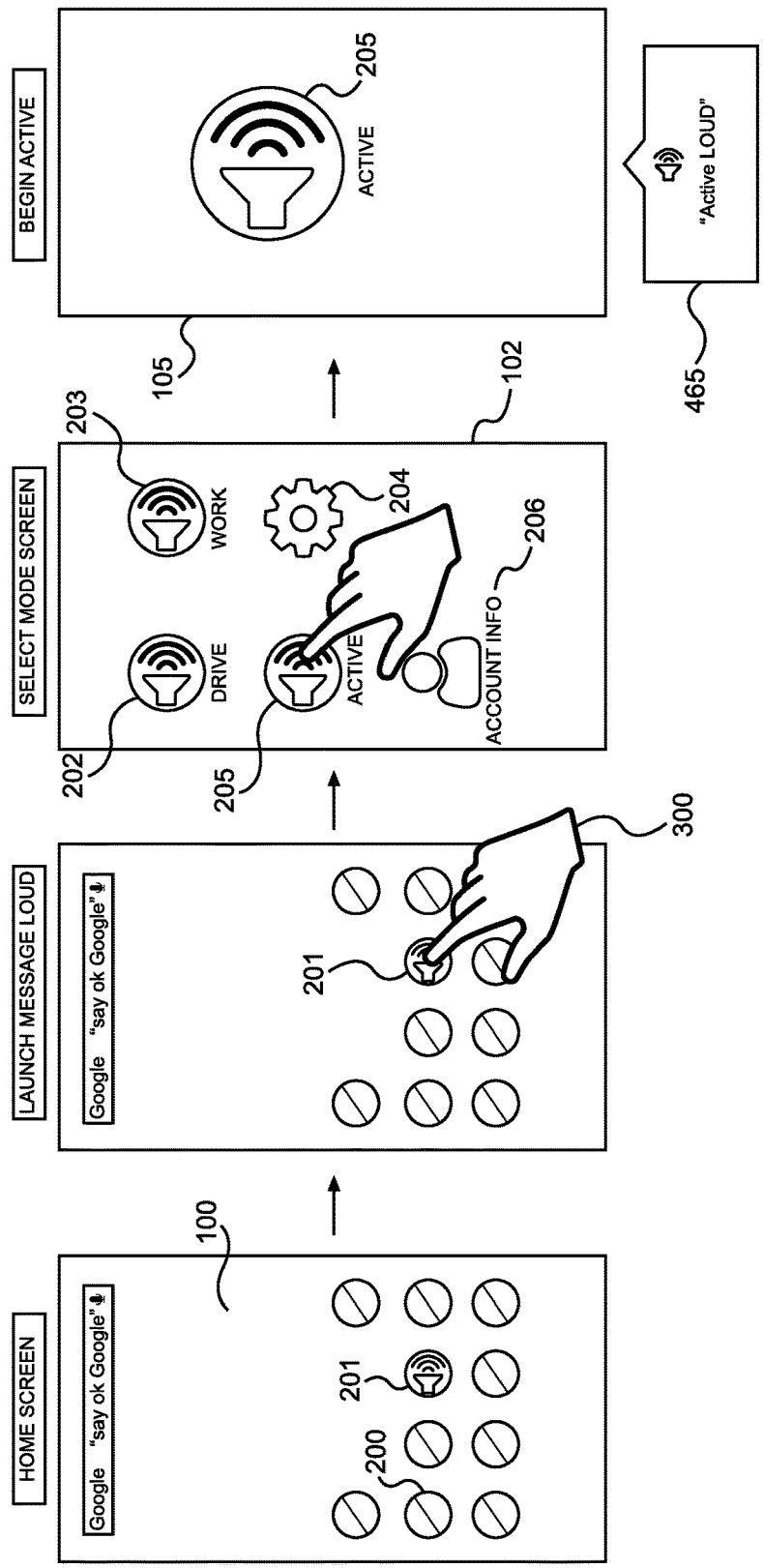
FIG. 1 illustrates a user launching the messageLOUD application and selecting Active Mode.

FIG. 1 illustrates a user launching the application (messageLOUD®) and selecting Active Mode 205. The messageLOUD icon 201 can be present on a home screen 100 with a number of other icons 200. A user 300 presses the messageLOUD icon 201, and then selects Active Mode 205. The user can select Drive Mode 202, Work Mode 203, Settings 204, or account information 206. The Drive Mode 202 relates to the situation when the user is driving. The user situates the mobile phone in such configuration in the vehicle so that the user can touch the screen of the mobile phone. The Work Mode 203 refers to the situation when the user is working and does not want to be distracted, for example by having to toggle between work that they are doing and their email program. In Work Mode, the phone or other device is placed in a position so that the user can touch the screen of the phone. The Active Mode 205 refers to the situation when the user is exercising (walking, cycling, running, at the gym) and would prefer not to be distracted, for example, by having to look at the screen of the phone. The Active Mode is designed to have an interface with large buttons so the user can press easily. In Active Mode, the user can have the option of placing the phone or other devices at greater distances where the user cannot reach the screen. If the user is walking and is holding the phone in hand and likes to make gestures, the user may actually prefer to operate the device in Drive Mode. As illustrated in FIG. 1, the Active Mode 205 is selected and the application makes an announcement that the application is in Active Mode by stating "Active Loud" 469.

FIG. 2 illustrates special cases where the incoming email is relatively long and will not fit on the screen. Long emails that overflow 485 scroll up 487 488 as the email is read aloud 486. FIG. 2 relates to the Active Mode 205 and Work Mode 203.

Figure 3:
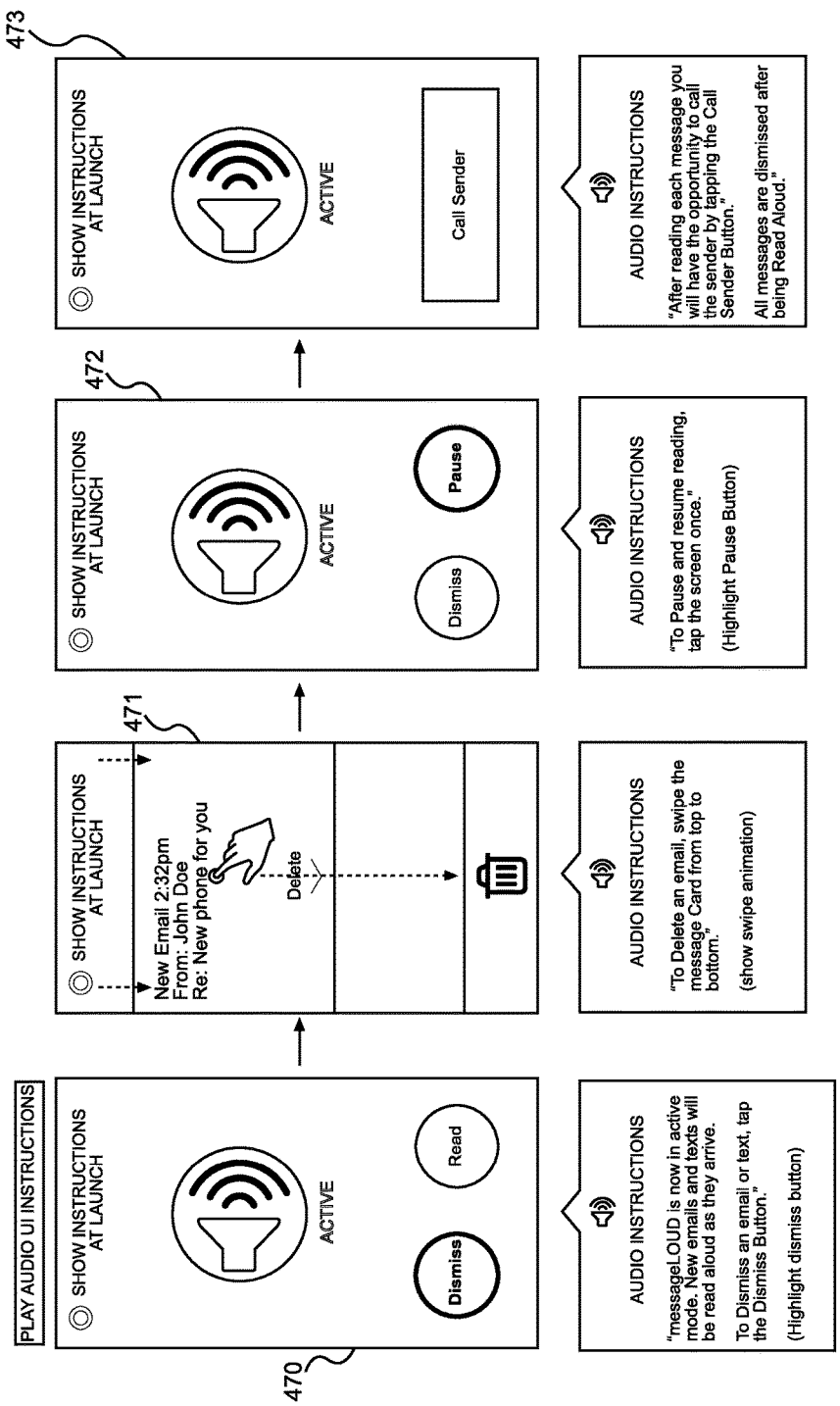
FIG. 3 illustrates a demonstration mode where a user is read aloud that the messageLOUD is now in Active Mode and is instructed on how to dismiss an email or a text message.

FIG. 3 illustrates a demonstration mode where a user is read aloud 470 that the messageLOUD application is now in Active Mode 205 and instructed on how to dismiss an email or text message. The user is then instructed on how to delete an email 471, how to pause and reread (resume) reading 472, and how to call a sender 473. A message from a messenger application would be dismissed in the same manner as a text message.

Figure 4:
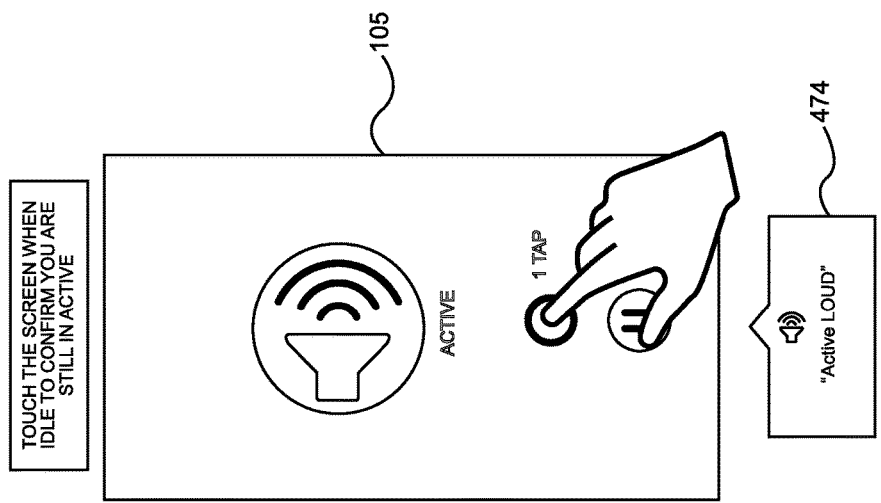
FIG. 4 illustrates the system in Active Mode that allows a user to touch screen to confirm that the phone or other mobile device is in a Active Mode.

FIG. 4 illustrates the system in Active Mode 205 that allows a user to touch a screen 105 to confirm that the phone or other mobile device is in Active Mode 205. The application will read aloud "Active Loud" 474 to assure the user that the application is in Active Mode 205. A user may seek to confirm the Active Mode 205 by tapping the screen in the event if the user has not received any emails, text messages, or a message from a messenger application.

Figure 5:
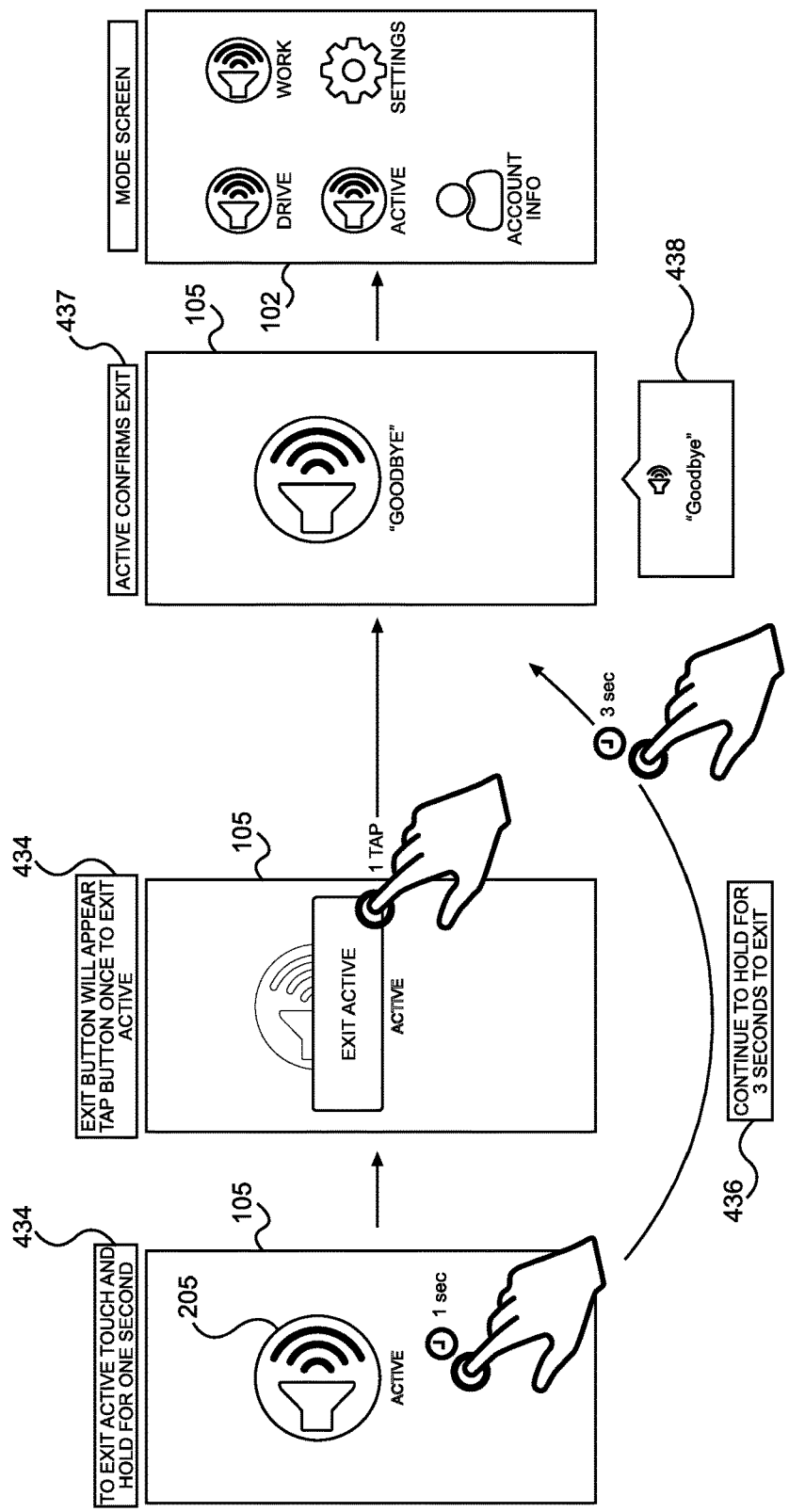
FIG. 5 illustrates a user exiting Active Mode.

FIG. 5 illustrates a user exiting Active Mode 205. The user can touch and hold for a predetermined amount of time (here one second) 434 to be prompted to press on an exit Drive Mode 205 button 435. Alternatively if the user holds onto the screen for 3 seconds 436, the user is automatically exited 437 from Active Mode 205. The application can inform the user aloud 438 that the user has exited Active Mode 205. The user is then directed to the application home page 102 with the different available modes for the user to select.

Figure 6:
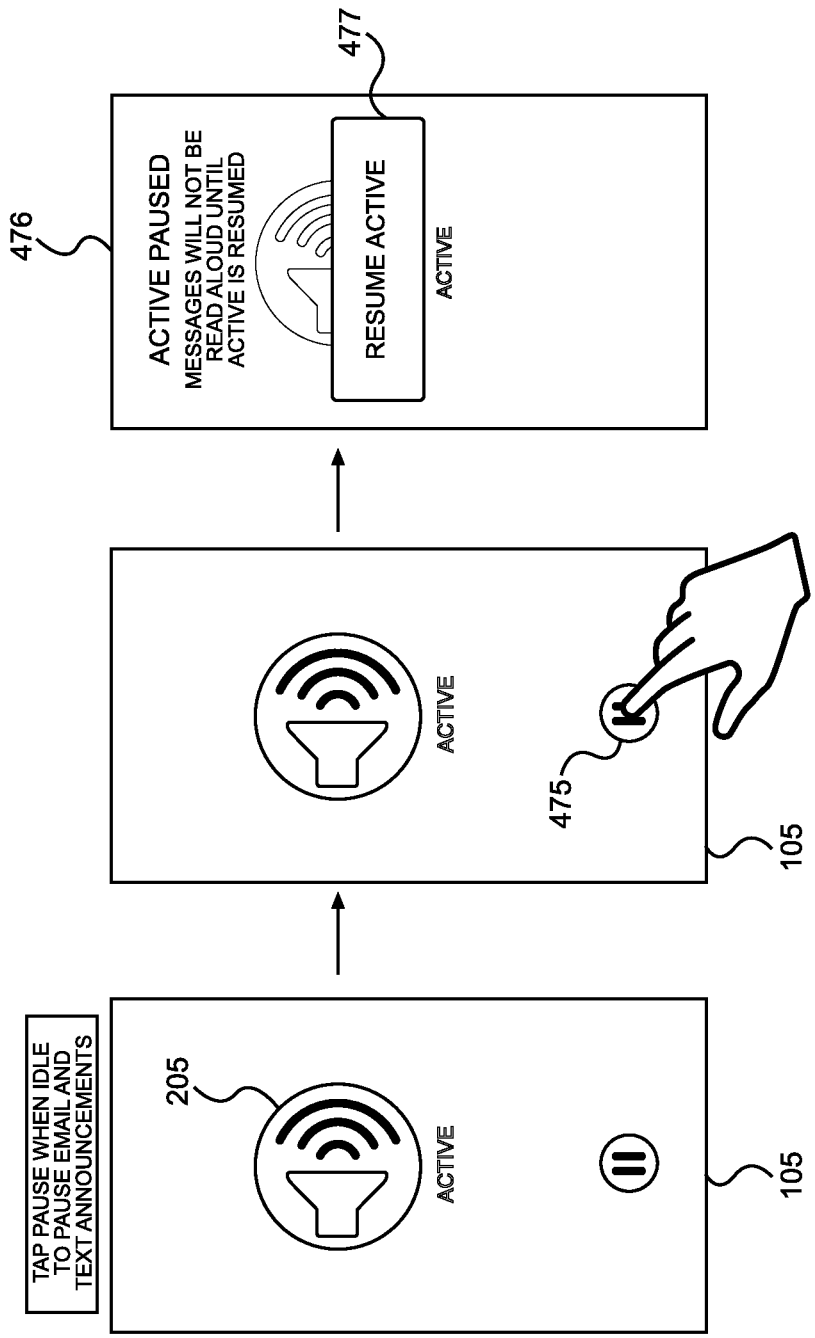
FIG. 6 illustrates a user tapping the Active Mode screen to pause email and text message announcements.

FIG. 6 illustrates a user tapping 475 the Active Mode 205 screen 104 to pause email and text announcements 476. A reread (resume) 477 button will then pop up which a user can tap or press to rereading of email and text message announcements. A message from a messenger application would be reread in the same manner as a text message.

Figure 7A:
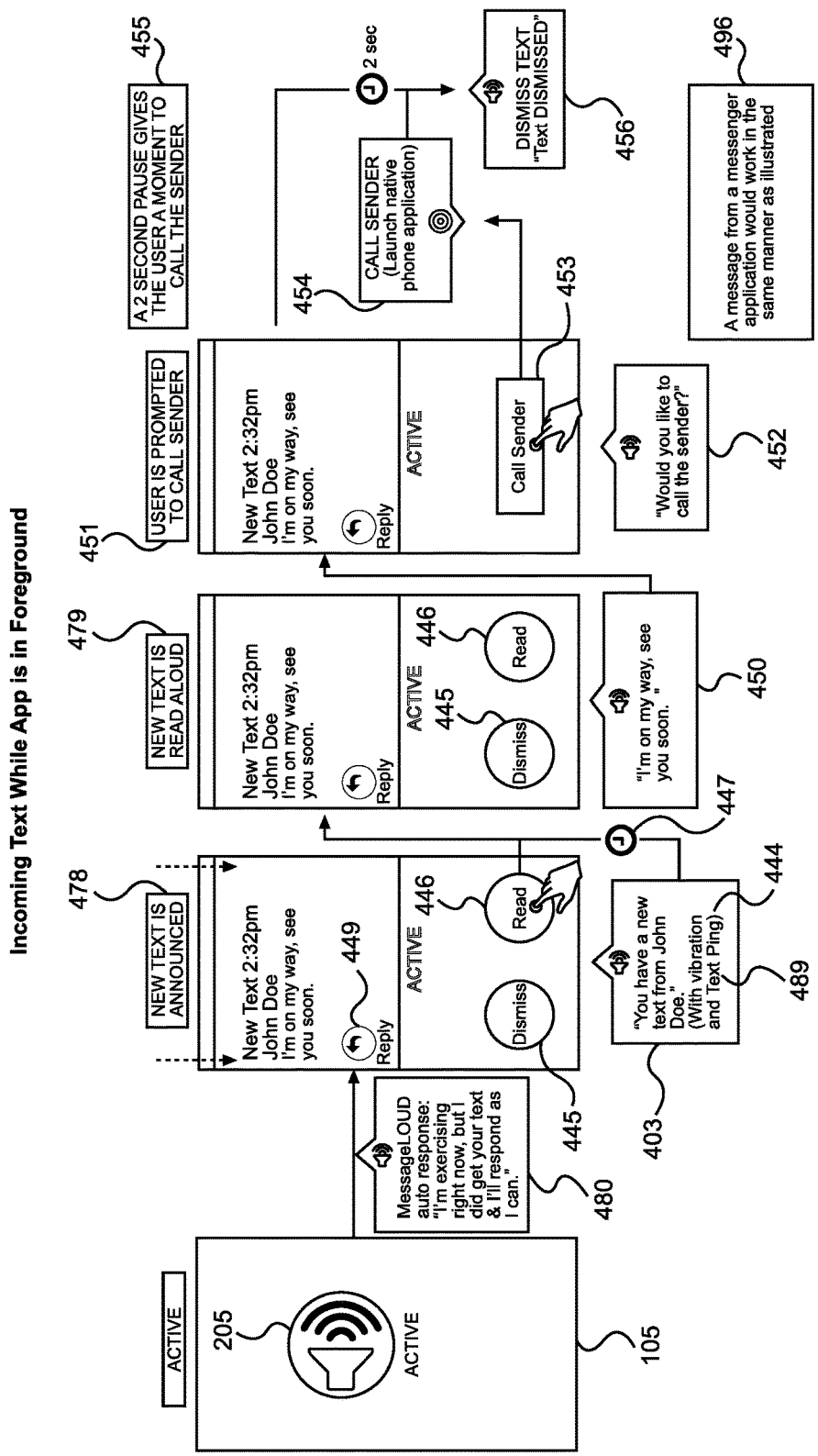
FIG. 7A illustrates the Active Mode when an incoming text message arrives while the application is in the foreground. A message from a messenger application would work in the same manner.

FIG. 7A illustrates the Active Mode 205 when an incoming text is received while the application is in the foreground. When a new text message is received, the text message is announced 478. Usually the identity of the sender, such as a name, phone number, or screen/profile name of the sender is announced 489. The application can send an automatic response to the sender informing the sender that the user is busy 480. A user can decide whether or not to have announcements and text messages are read aloud. In this case, the user's default is that announcements and text messages are read aloud 479. The mobile phone or other device can also vibrate 444. In this case, a predetermined amount of time (a two second pause) 447 is allowed for a user to take an action before the text message is read aloud. A user can dismiss the text message by pressing the dismiss button 445 or have the application read aloud the text message by pressing the read button 446. If the user presses the read button 446, the application will display and read aloud (according to the default selected by the user) the body of the text 479. The body of the text message is read without any user input. The read button 446 can shorten the delay period from announcement of the text 478 to reading the body of the text 479. Unless the user presses the dismiss 445, reply 449, or delete 465 buttons, the application will then prompt the user to call the sender 451, 452, 453. If the user presses on the call sender 453 button, then the native phone application 454 of the device that is being used will be launched. If after a pause 455, the user takes no action the text message is dismissed 456. At anytime during this process, a user can press the reply button 449 to open the native text messaging application on the device that is being used. A message from a messenger application would be handled in the same manner as a text message.

Figure 7B:
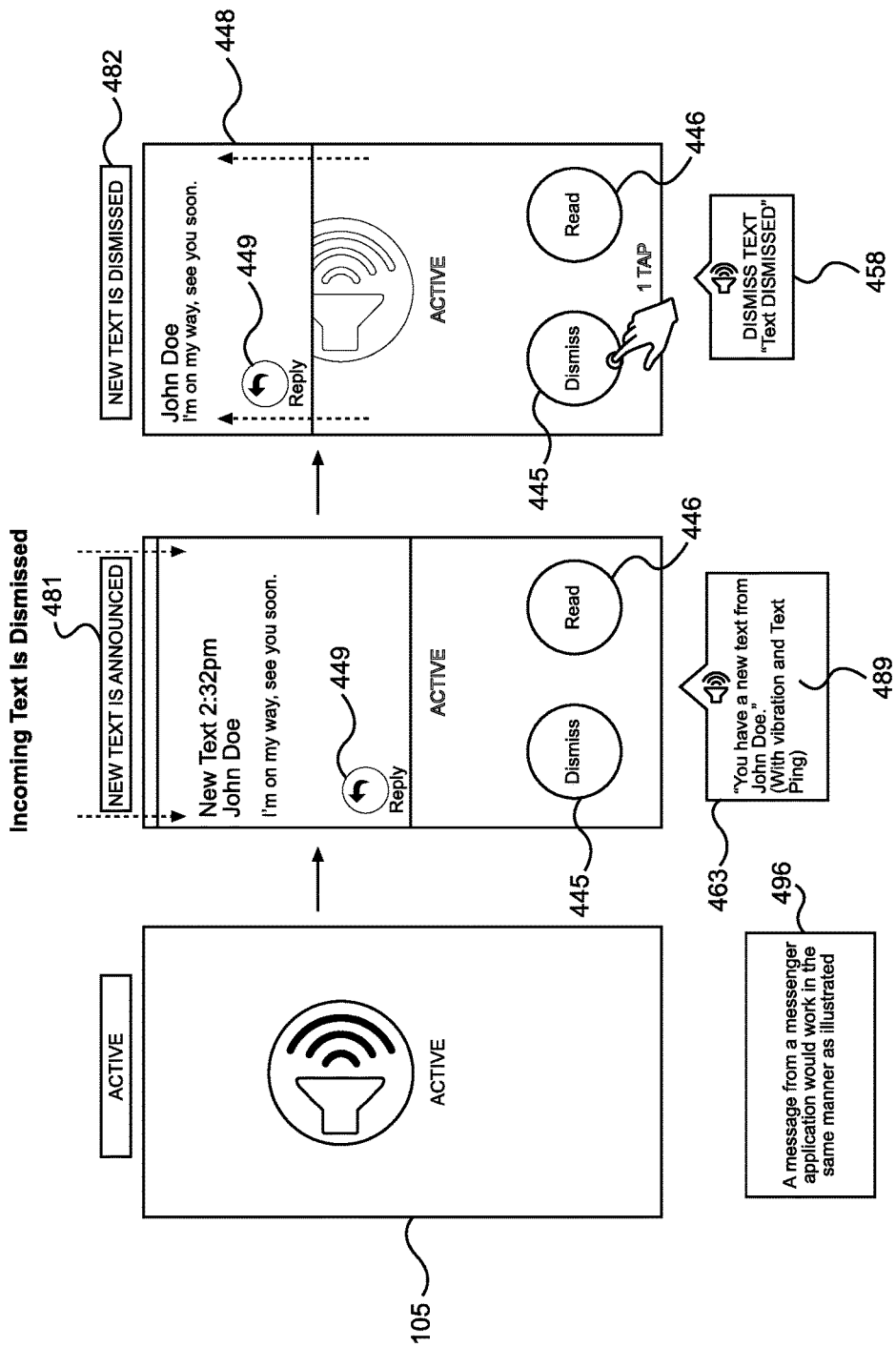
FIG. 7B illustrates the dismissing of an incoming text message by a user. A message from a messenger application would work in the same manner.

FIG. 7B illustrates dismissing of an incoming text message by a user. After a new text is announced 481, the user presses the dismiss button 445, and the text is dismissed 482. The dismissal of the text message can be read aloud 458. After dismissal, the textbox slides away 448 as illustrated. A message from a messenger application would be handled in the same manner as a text message.

Figure 7C:
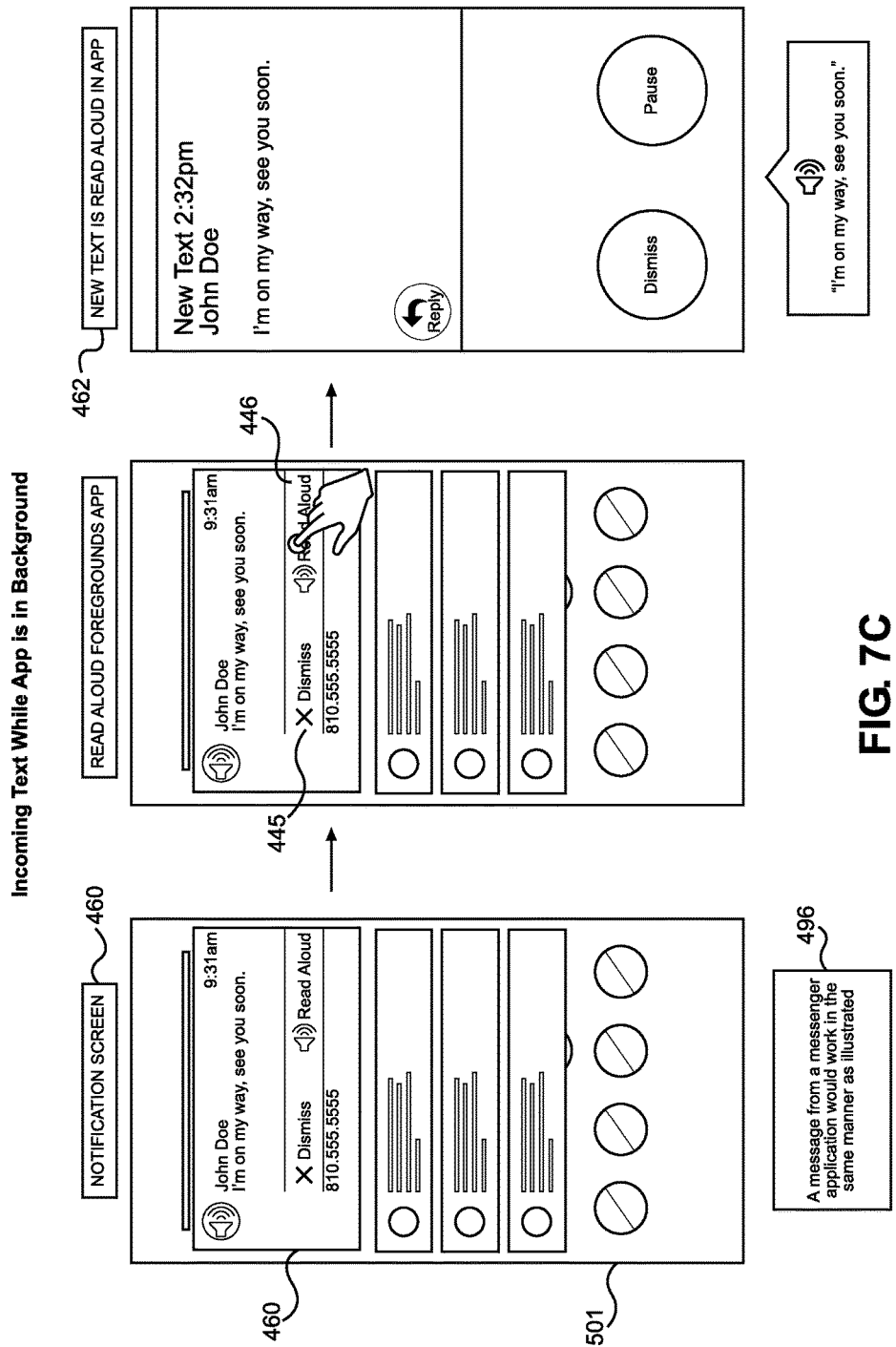
FIG. 7C illustrates when an incoming text message is received while the Active Mode is in the background. A message from a messenger application would work in the same manner.

FIG. 7C illustrates when an incoming text message is received while the Active Mode 205 is in the background. The mobile phone or other device of the user can have a notification screen 460 that depending on settings of the device can be pulled down or automatically pops up. The user is provided with the options of a dismiss 445 and read aloud button 446. If the user presses on the read aloud button 446, then the Active Mode 205 moves into the foreground, and the new text message is read aloud 462. A message from a messenger application would be handled in the same manner as a text message.

Figure 8A:
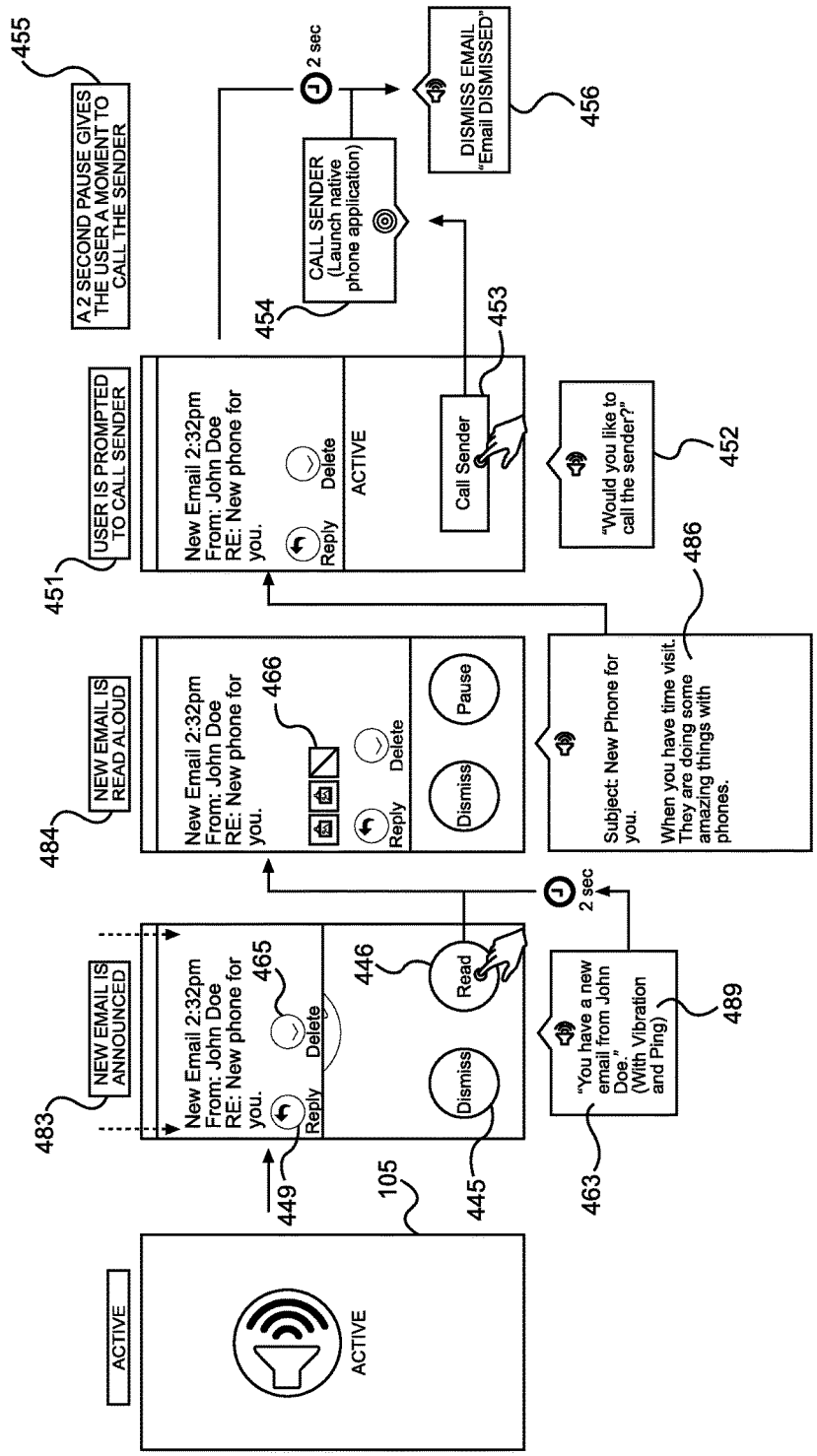
FIG. 8A illustrates the Active Mode when an incoming email is received while the application is in the foreground.

FIG. 8A illustrates the Active Mode 205 when an incoming email is received while the application is in the foreground. When an email message is received, the email message is announced 483 without any user inputs (Both text and emails are announced automatically without any user input). Usually the identity of the sender, such as a name, email address, or screen/profile name of the sender is announced 489. A user can decide whether or not to have announcements and emails be read out loud. In this case, the user's default is that announcements and email messages are read aloud 463. The announcements and email messages are both read aloud without any user input. The mobile phone or other device can also vibrate 489. A user can dismiss the email by pressing the dismiss button 445 or have the application read aloud the email by pressing the read button 446. If the user does nothing, the application after the pause will automatically display and read aloud the body of the email 484. Unless the user presses the dismiss 445 or reply 449 buttons, the application will then prompt the user to call the sender 451, 452, 453. If the user presses on the call sender 453 button, then the native phone application 454 of the device that is being used will be launched. If after a pause 455, the user takes no action, the email is dismissed 456. At anytime during this process, a user can press the reply button 449 to open the native email application on the device that is being used.

Figure 8B:
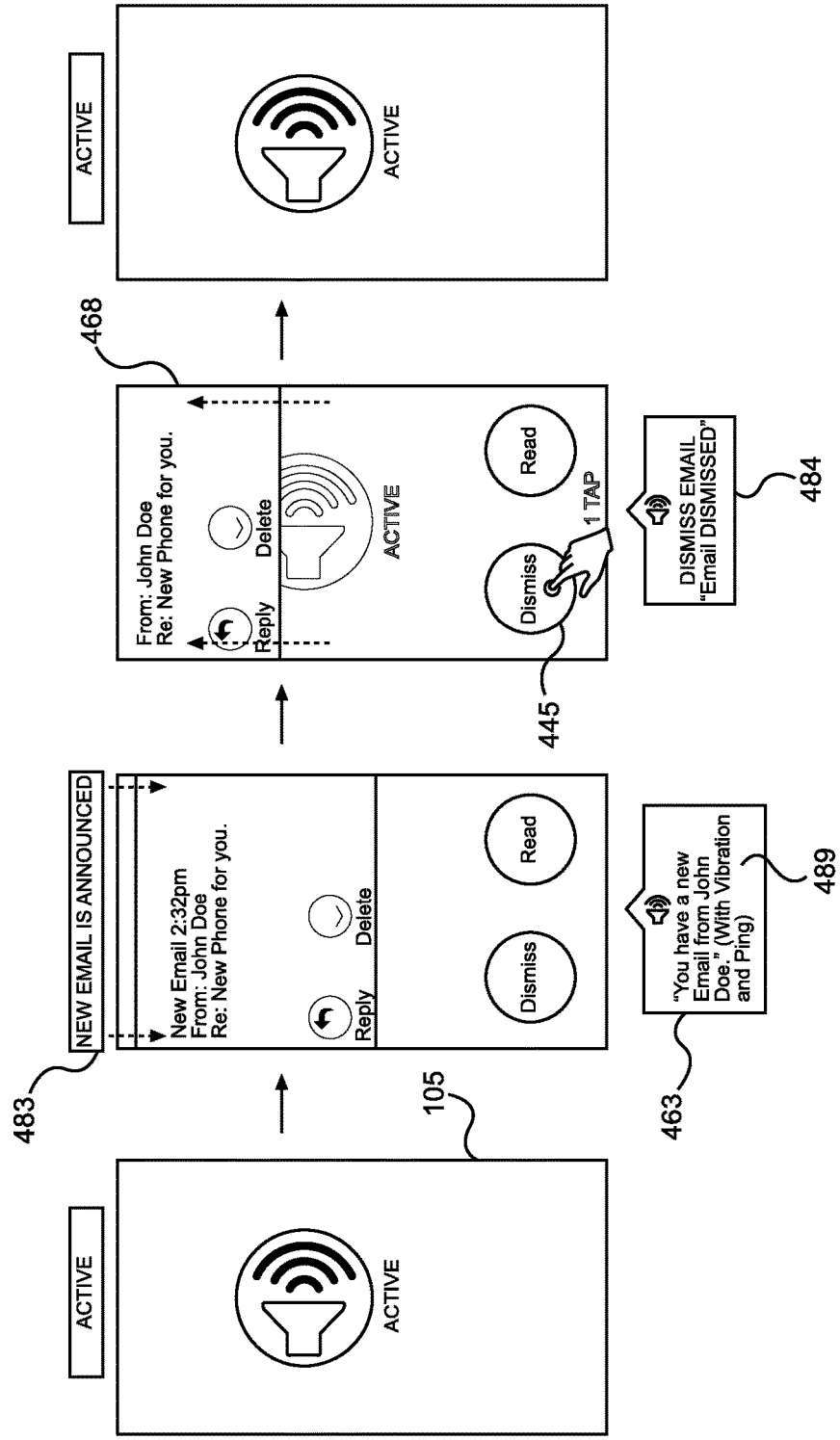
FIG. 8B illustrates dismissing of an incoming email by a user in Active Mode.

FIG. 8B illustrates dismissing of an incoming email by a user in Active Mode 205. After a new email is announced/read aloud 483, the user presses the dismiss button 445, and the email is dismissed. The dismissal of the email can be read aloud 484. After dismissal, the textbox slides away 468 as illustrated, and the Active Mode clean screen is shown 105.

Figure 8C:
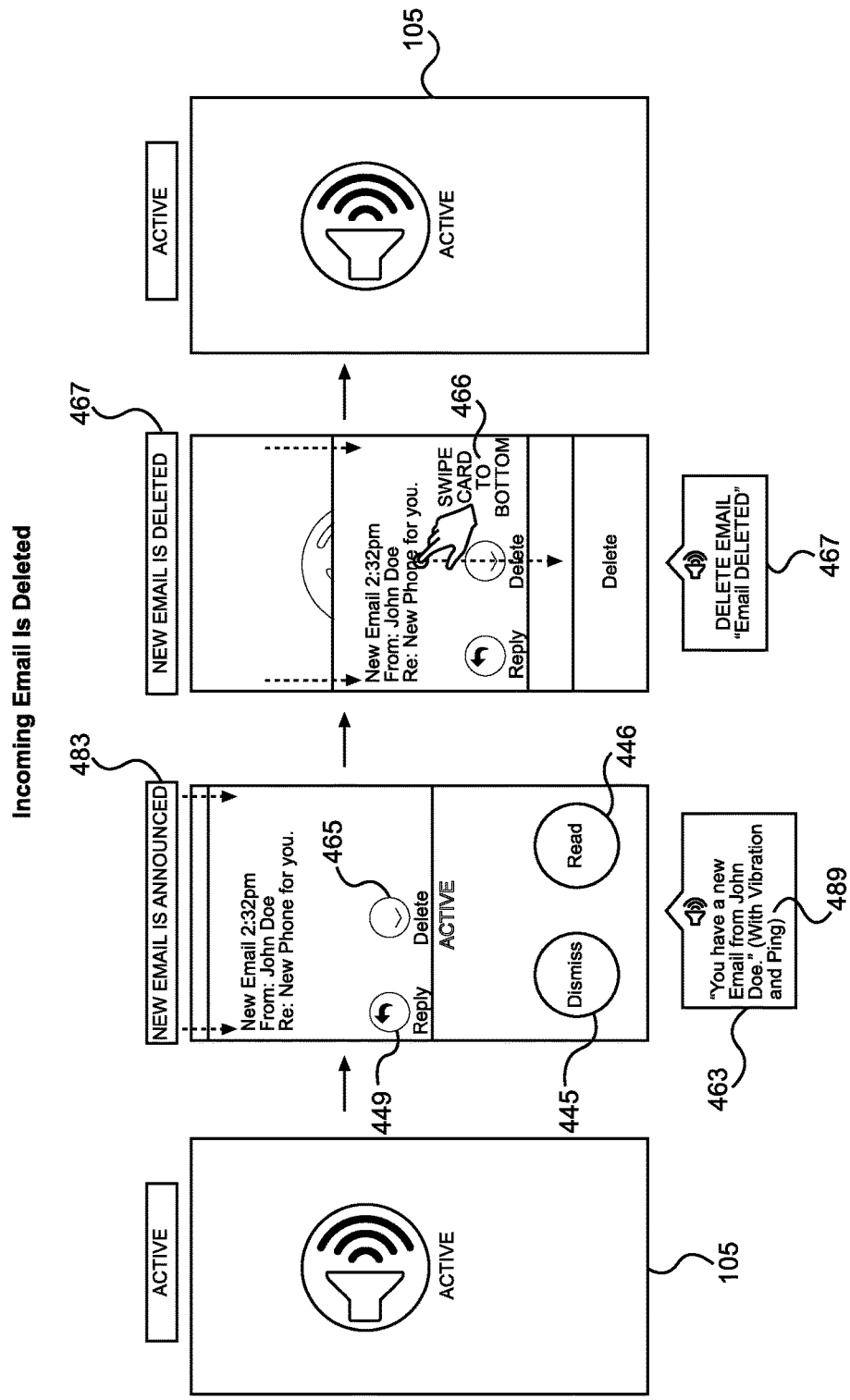
FIG. 8C illustrates when an incoming new email is deleted.

FIG. 8C illustrates when an incoming new email is deleted. After a new email is announced 483, the user swipes top to down 466 to delete the email. In addition to deleting an email by swiping down, the user can press the delete button 465. The application, depending on the setting, can inform the user aloud 467 that the new email has been deleted.

Figure 8D:
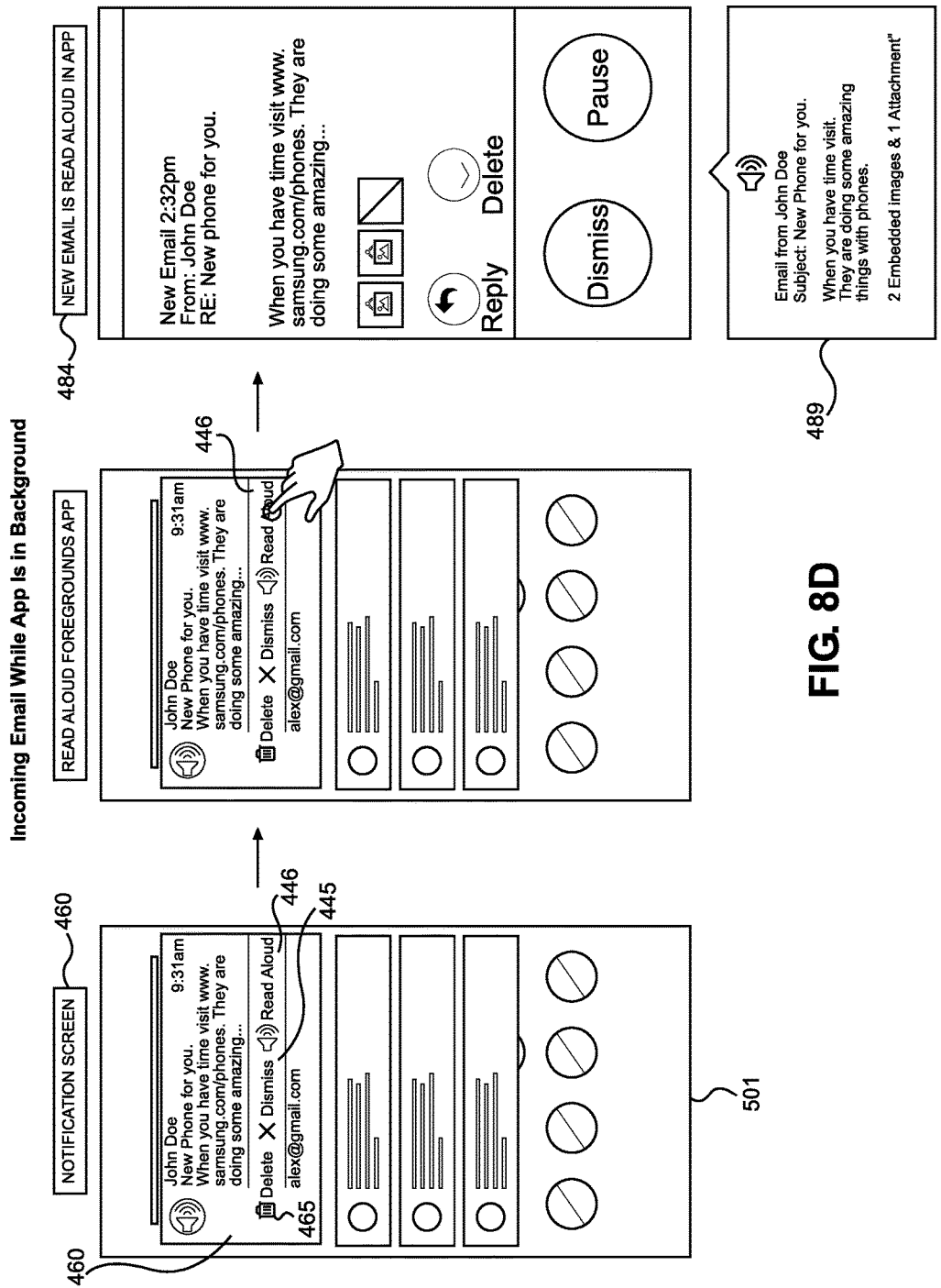
FIG. 8D illustrates when a new email is received while the Active Mode is in the background.

FIG. 8D illustrates when a new email is received while the Active Mode 205 is in the background. The mobile phone or other device of the user can have a notification screen 460 that depending on settings of the mobile device can be pulled down or automatically pops up. The user is provided with the options of a dismiss button 445, a read aloud button 446, and a delete button 465. If the user presses on the read aloud button 446, then the application (Active Mode) moves into the foreground 461, and the new email is read aloud 484.

Figure 9:
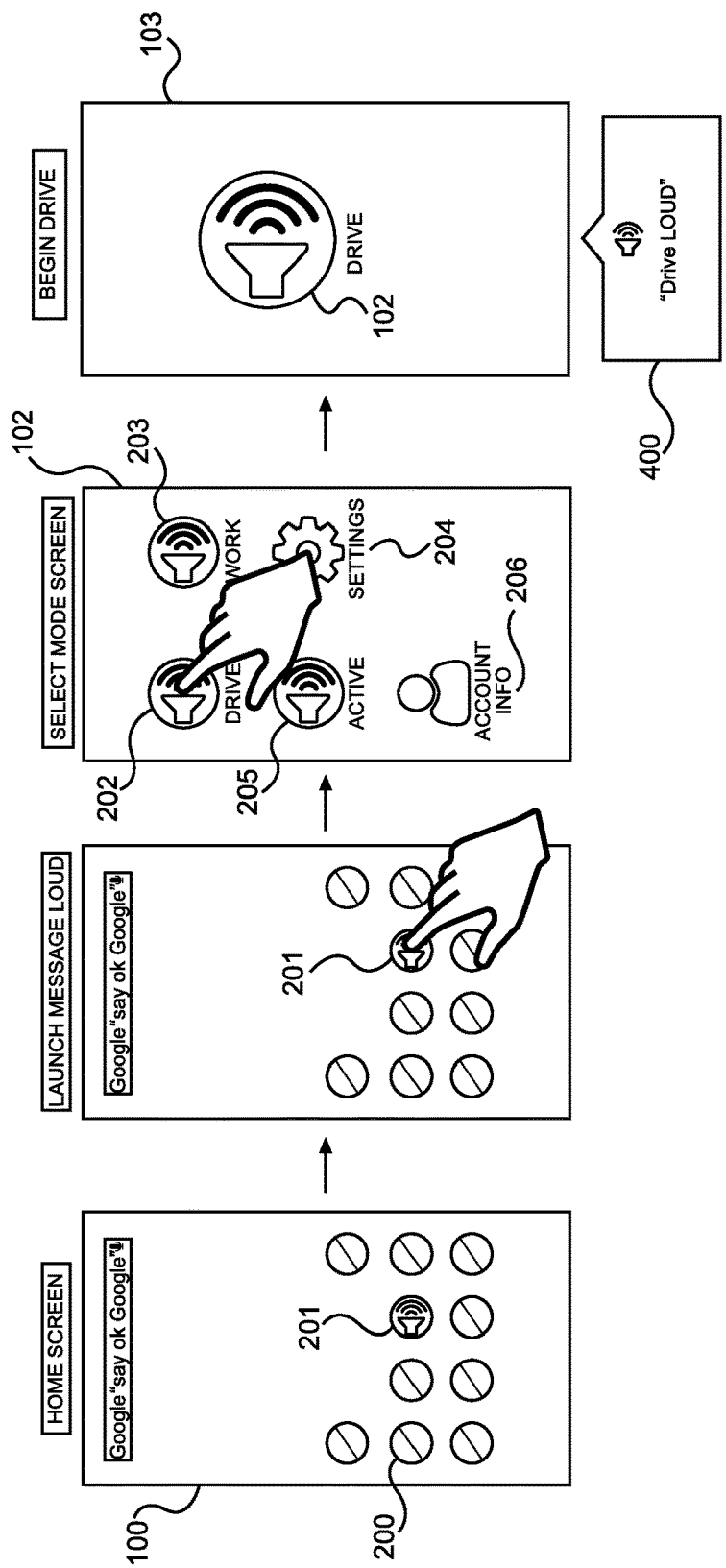
FIG. 9 illustrates a user launching the application and selecting Drive Mode.

FIG. 9 illustrates a user launching the messageLOUD application and selecting Drive Mode 202. The messageLOUD icon 201 can be present on a home screen 100 with a number of other icons 200. A user 300 presses the messageLOUD icon 201, and then selects the Drive Mode 202. The Drive Mode 202 is then selected and the application makes an announcement that the application is in Drive Mode by stating "Drive Loud" 400.

Figure 10:
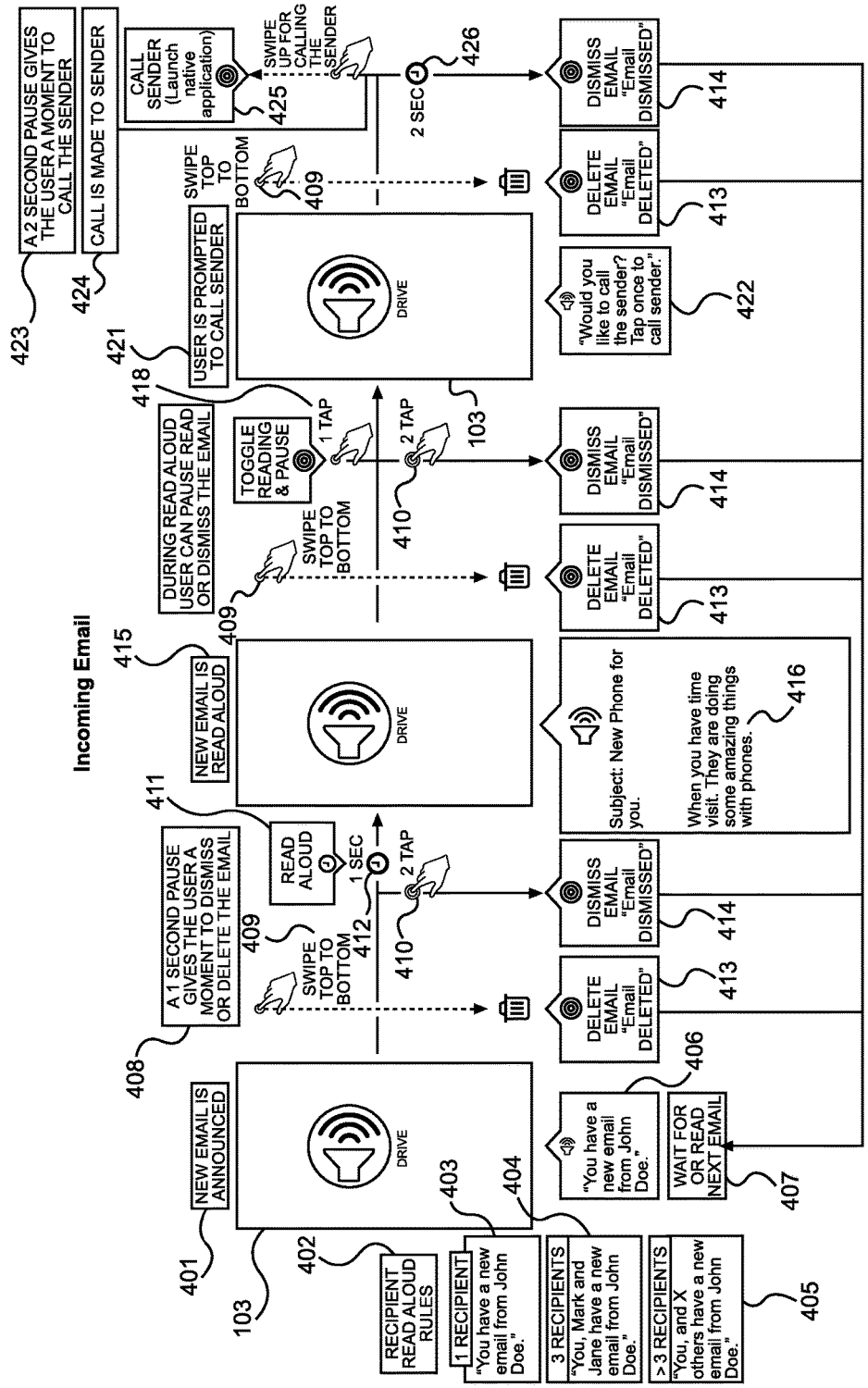
FIG. 10 illustrates receiving emails in Drive Mode.

FIG. 10 illustrates receiving emails in Drive Mode 202. A new email is announced 401. The announcement of the email is done automatically without any user input. The announcement of the email 401 can be done according to a pre-existing rules 402. The rule can for example be that names of the sender along with each recipient up to 3 recipients are read aloud 403, 404, and when more than 3 recipients, the name of the user 300 is announced along with the number (for example "4 other") of other recipients that exist 405. The email announcement that includes the name of the sender 406 is read aloud. A time delay (a predetermined amount of time), typically a 1 or 2 second pause, gives a user a moment to dismiss or delete the email 408. The user can for example swipe top to bottom 409 to delete the email 413. A user can also tap two times 410 to dismiss the email. If the user takes no action during the pause 412, the body of the email is read aloud (411, 415) automatically without any user input. The subject and the email body is read aloud 416 in this example. While the email is being read 415, a user can delete 413 the email by swiping top to bottom 409, dismiss the email by tapping 2 times, or pause/play by tapping once 418. If the user takes no action when the email is being read, after the email is read, the user is prompted 421 to call the sender of the email 421. The user can be asked aloud if the user would like to call the sender 422. A pause 423 can give the user an opportunity to call the sender. If the user swipes top to bottom 409, the email is deleted and no further action is taken. If the user swipes up 425, a call is made 424 by launching the native phone application. If the user does nothing after a pause 426, the system automatically dismisses the email 414. The user would then await the receipt of a subsequent email to be read aloud 407.

FIG. 10 illustrates the clean user interface 103 of Drive Mode 202. Only a non-functional logo appears in this instance on the interface 103. The user is not given any prompt that requires touching the screen, allowing the user to memorized gestures and use these gestures (for example by tapping or swiping the screen) to command the application to take an action without looking at the screen. Generally, four gestures can be used to operate the application, including a single tap, a swipe down, a double tap, and a swipe up.

Figure 11:
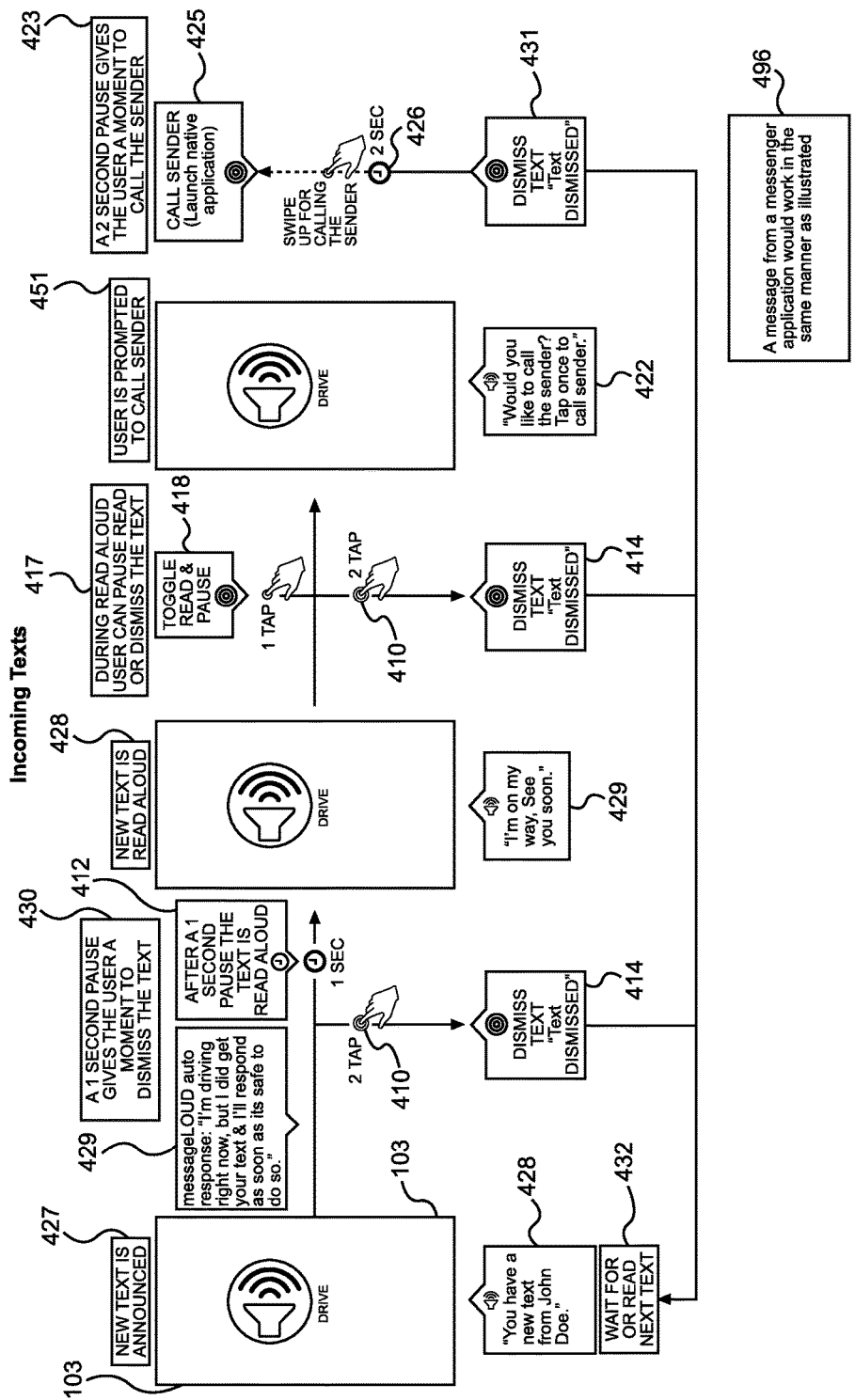
FIG. 11 illustrates receiving a text message in Drive Mode. A message from a messenger application would work in the same manner.

FIG. 11 illustrates receiving a text message in Drive Mode 202. After the user selects Drive Mode 202 as illustrated in FIG. 9, the name of the sender of a new text message 427 is automatically read aloud 428 without any user input. The Drive Mode 202 can have an automatic response 429 that informs the sender that the recipient is busy. A one or two second pause 430 is provided to give the user the opportunity to dismiss the text message by tapping twice 410, 414. If the user does not dismiss the text message after the pause, then the body of the text message is read aloud 428, 429 automatically without any user input. During reading of the body of the text message aloud 417, the user can pause or dismiss the text 492. The user can pause the text message by tapping once 418. The user can dismiss the text message by tapping twice 414. If the user does not dismiss the text message 414, then after the body of the text is read aloud, the user is prompted to call the sender 421 by asking the user aloud 422 if the user likes to call the sender. A pause is given 423 to give the user an opportunity to call the sender. If the user swipes up 425, a call is made by launching the native phone application. If the user does nothing after a pause 426, the system automatically dismisses the text message 431. The user would then await the receipt of a subsequent text message to be read aloud 432.

Figure 13:
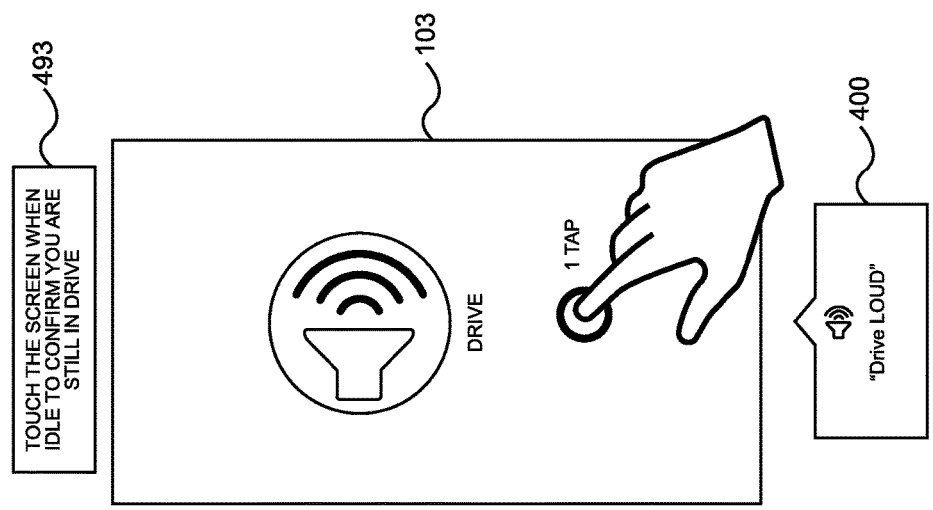
FIG. 13 illustrates a user touching a screen to confirm that the phone or other mobile device is in Drive Mode.

FIG. 13 illustrates the system in Drive Mode 202 that allows a user to touch screen 103 to confirm 493 that the phone or other mobile device is in a Drive Mode 202. The application will read aloud "Drive Loud" 400 to assure the user that the application is in Drive Mode. A user may seek to confirm the Drive Mode by tapping the screen in the event if the user has not received any emails or text messages. A message from a messenger application would be handled in the same manner as a text message.

Figure 14:
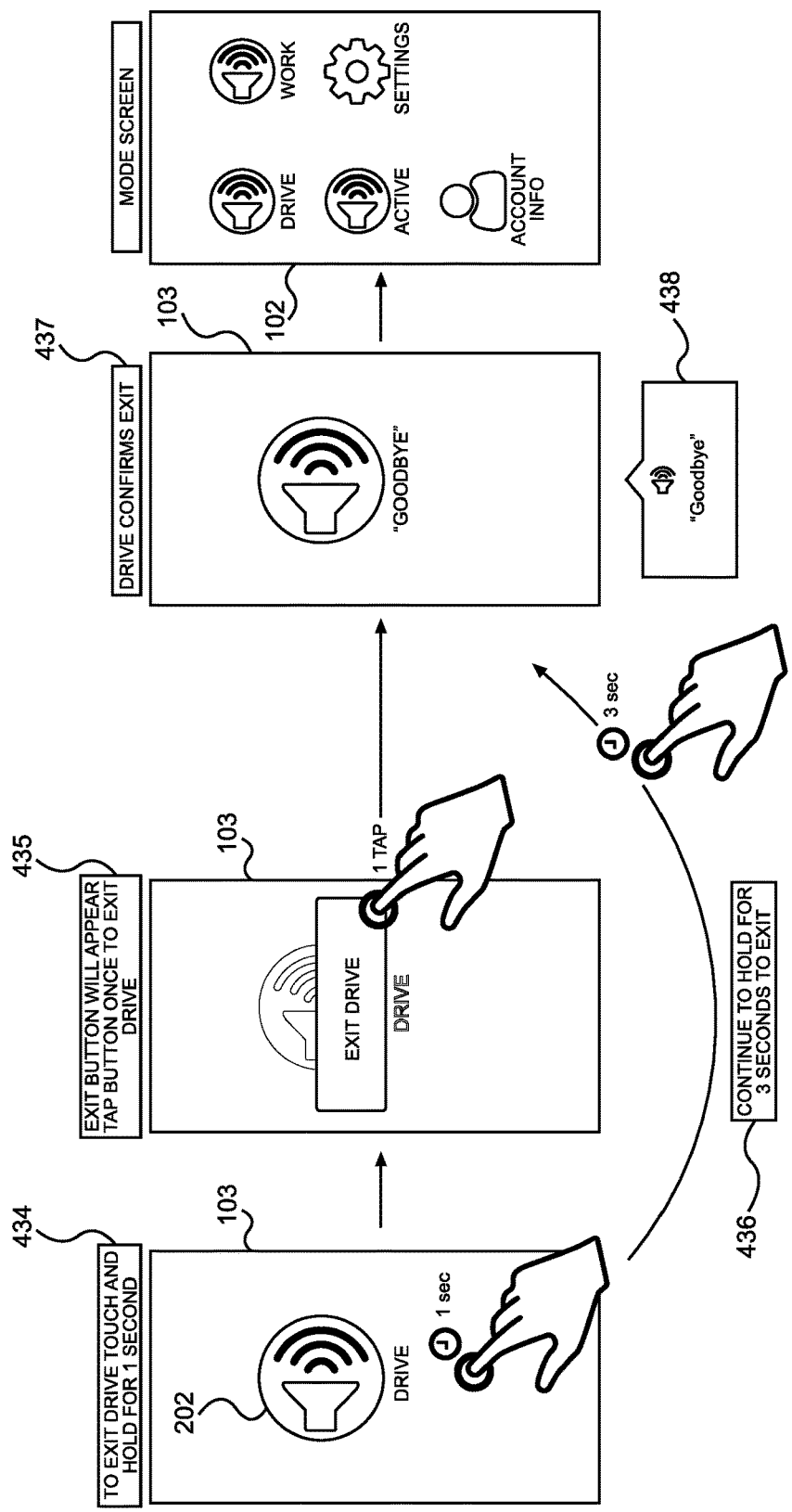
FIG. 14 illustrates a user exiting Drive Mode.

FIG. 14 illustrates a user exiting Drive Mode 202. The user can touch and hold for a second to be prompted 435 to press on an exit Drive Mode button. Alternatively if the user holds onto the screen for a predetermined amount of time, such as 3 seconds 436, the user is automatically exited 437 from Drive Mode 202. The application can inform the user aloud 438 that the user has exited Drive Mode 202. The user is then directed to the application home page 102 with the different available modes for the user to select.

Figure 15:
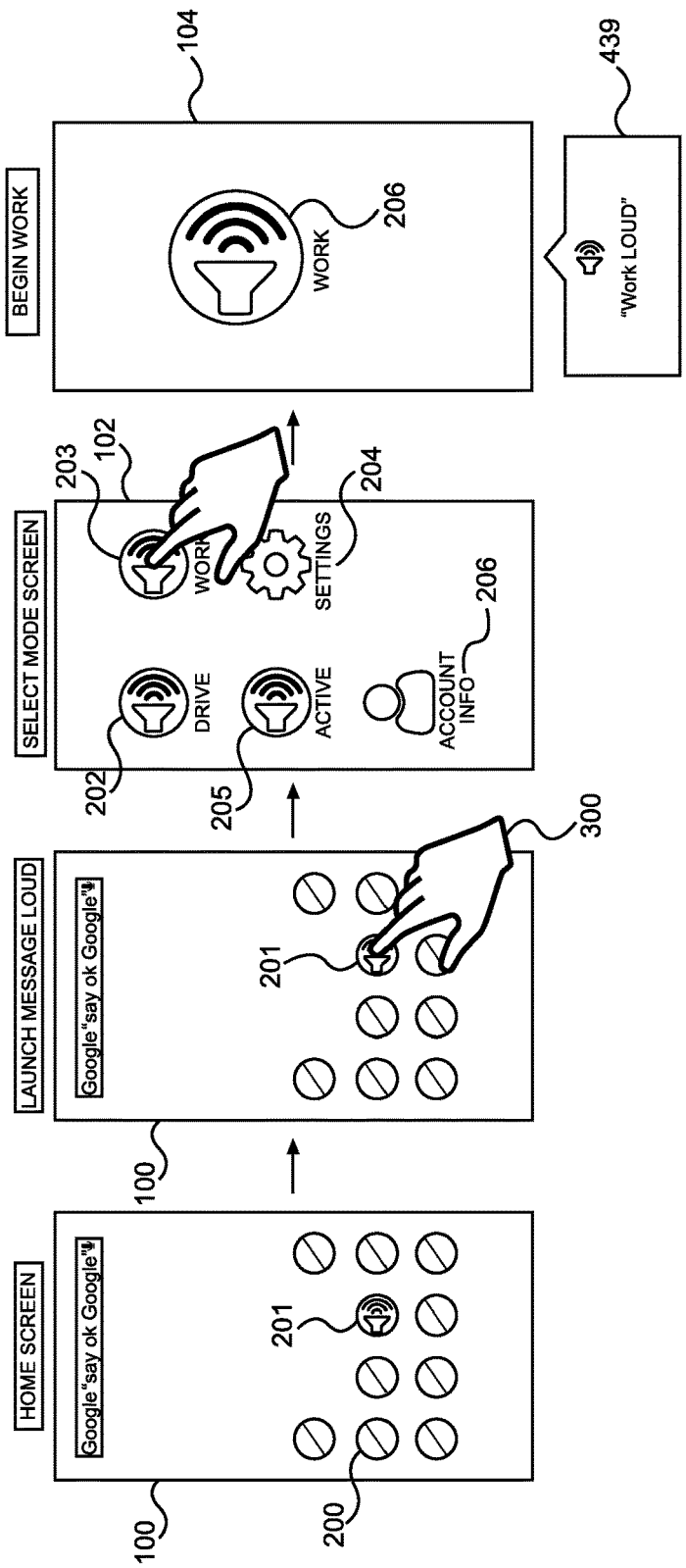
FIG. 15 illustrates a user launching Work Mode.

FIG. 15 illustrates a user launching Work Mode 203. The messageLOUD icon 201 can be present on a home screen 100 with a number of other icons 200. A user 300 presses the messageLOUD icon 201, and then selects the Work Mode 203. The Work Mode 203 is then selected and the application makes an announcement that the application is in Work Mode by stating "Work Loud" 439.

Figure 16:
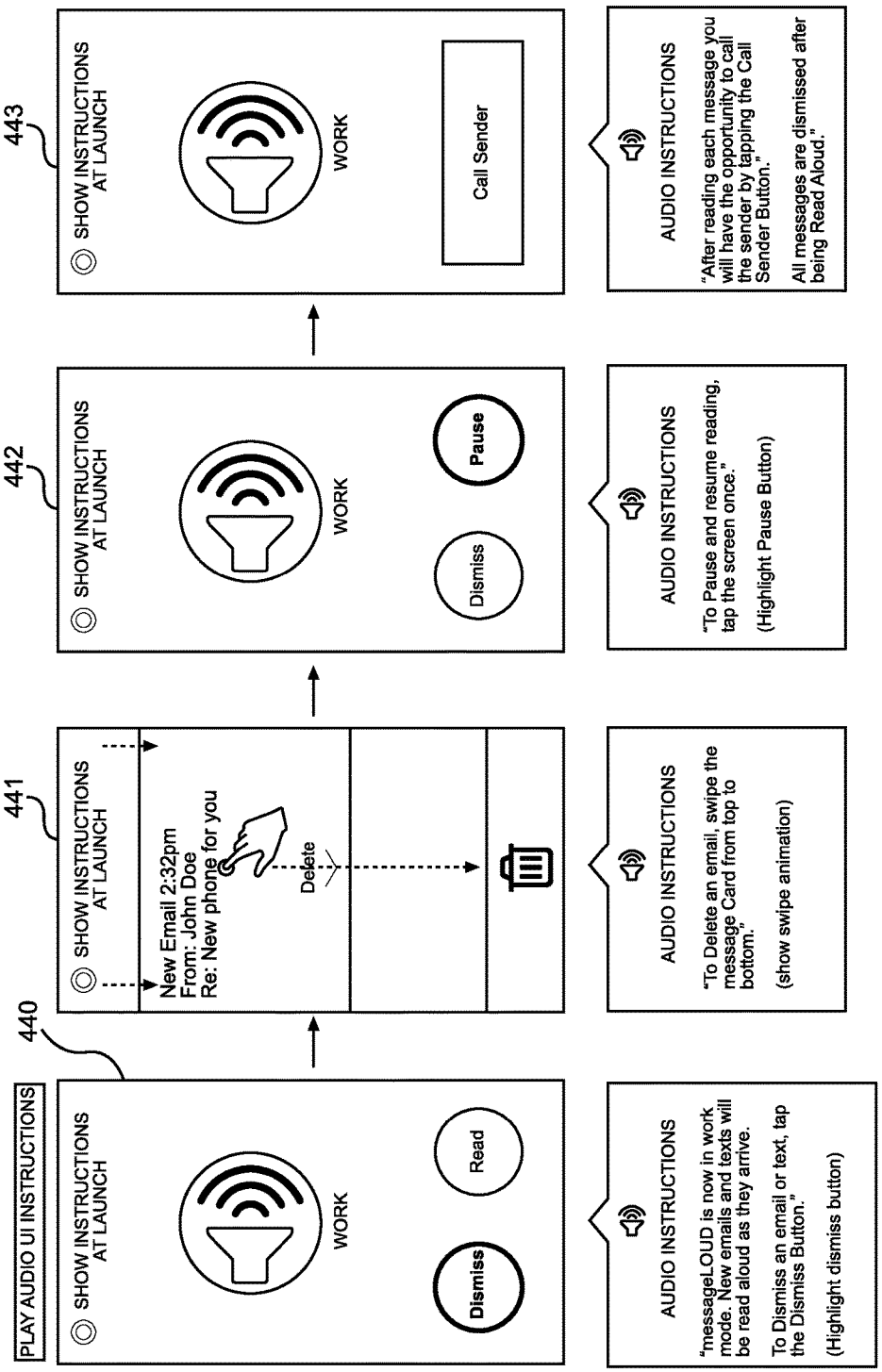
FIG. 16 illustrates a demonstration mode where a user is read aloud that the messageLOUD is now in Work Mode and is instructed on how to dismiss an email or a text message. A message from a messenger application would work in the same manner as a text message.

FIG. 16 illustrates a demonstration mode where a user is read aloud 440 that the messageLOUD is now in Work Mode 203 and instructed on how to dismiss an email or text. The user is then instructed on how to delete an email 441, how to pause and reread (resume) reading 442, and how to call a sender 494.

Figure 17:
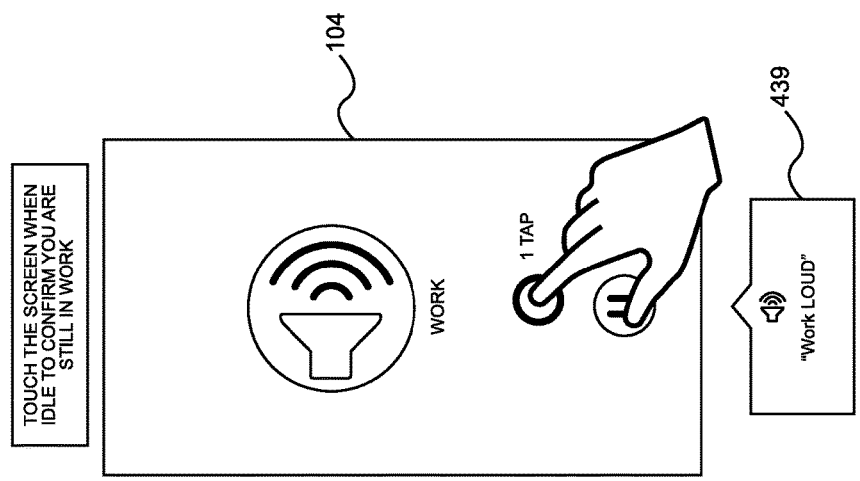
FIG. 17 illustrates a user touching a screen to confirm that the phone or other mobile device is in a Work Mode

FIG. 17 illustrates the system in Work Mode 203 that allows a user to touch screen 104 to confirm that the phone or other mobile device is in Work Mode 203. The application will read aloud "Work Loud" 439 to assure the user that the application is in Work Mode 203. A user may seek to confirm the Work Mode 203 by tapping the screen in the event if the user has not received any emails or text messages.

Figure 18:
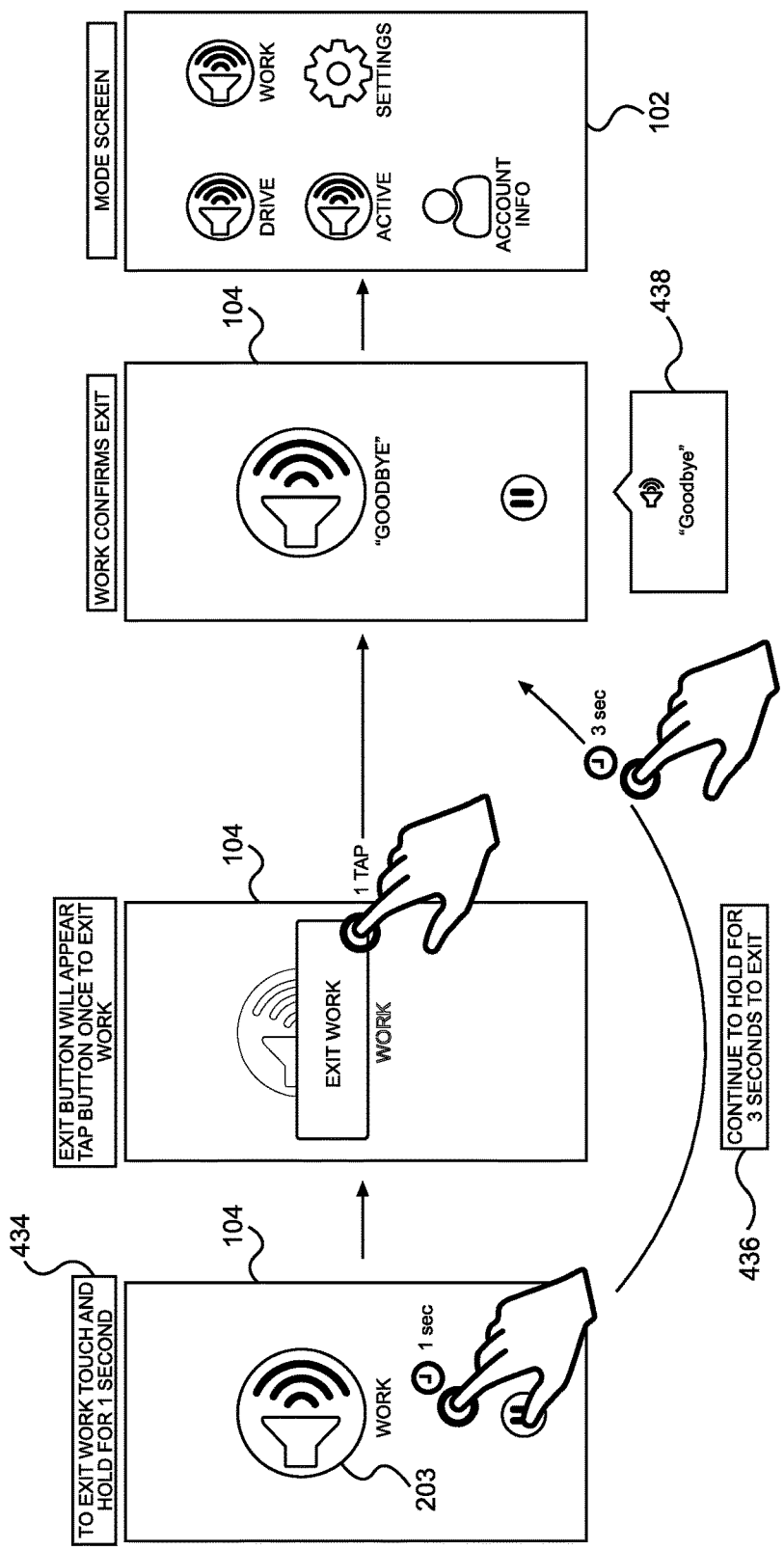
FIG. 18 illustrates a user exiting Work Mode.

FIG. 18 illustrates a user exiting Work Mode 203. The user can touch and hold for a second to be prompted 435 to press on an exit Work Mode button. Alternatively if the user holds onto the screen for 3 seconds 436 (or other predetermined amount of time), the user is automatically exited 437 from Work Mode 203. The application can inform the user aloud 438 that the user has exited Work Mode 203. The user is then directed to the application home page 102 with the different available modes for the user to select.

Figure 19:
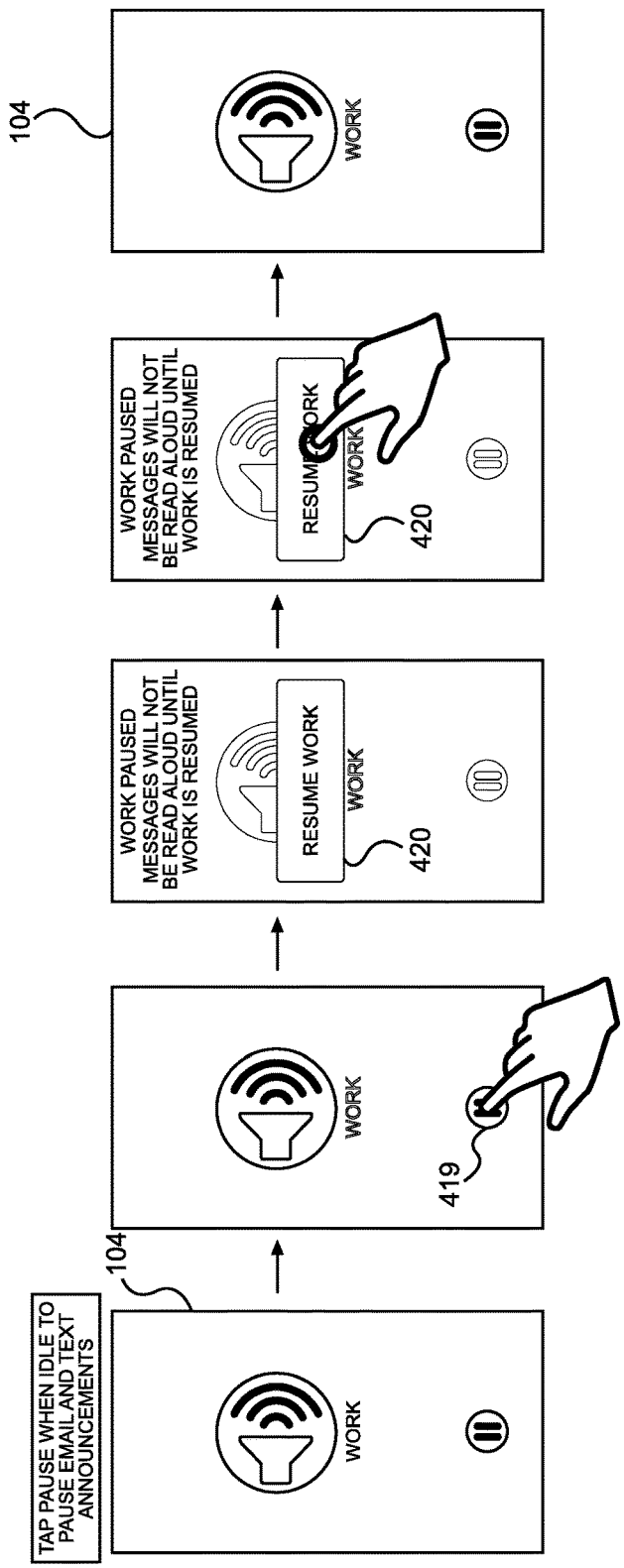
FIG. 19 illustrates the ability of a user to pause Work Mode when a user seeks to take a break.

FIG. 19 illustrates the ability of a user to pause Work Mode 203 when a user seeks to take a break. A user can press a pause button 419 to pause Work Mode 203. A "Resume Work" button 420 comes on the screen 104 which the user presses to resume the Work mode 203.

Figure 20A:
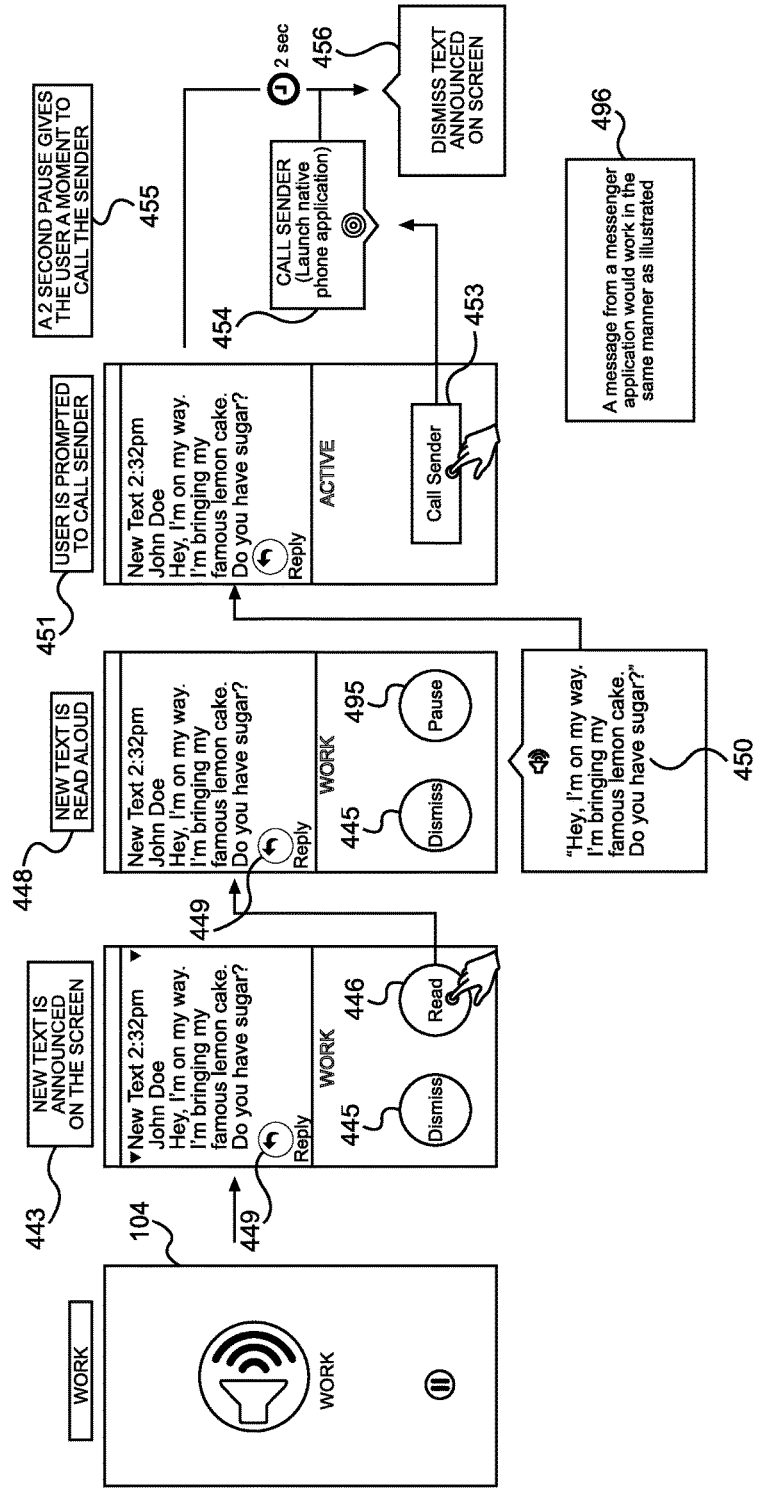
FIG. 20A illustrates when an incoming text message arrives in Work Mode while the application is in the foreground. A message from a messenger application would work in the same manner.

FIG. 20A illustrates the Work Mode 203 when an incoming text message arrives while the application is in the foreground. When a new text message is received, the text message announcement 443 comes on the screen. In this case, a loud announcement is not made. A user can decide by pressing the read button 446 whether or not to have the text messages be read aloud 448. The mobile device can also vibrate 444 or make a ping sound. A user can dismiss the text message by pressing the dismiss button 445 or have the application read aloud the text message by pressing the read button 446. If the user presses the read button 446, the application will display and read aloud (according to the default selected by the user) the body of the text 448, 450. Unless the user presses the dismiss 445, reply 449, or delete 465 buttons, the application will then automatically without any user input prompt the user to call the sender 451, 452, 453. The user can pause 495 reading aloud of the text message. If the user presses on the call sender 453 button, then the native phone application 454 of the device that is being used will be launched. If after a pause 455, the user takes no action the text message is dismissed 456, and the dismissed announcement is made on the screen. At anytime during this process, a user can press the reply button 449 to open the native text messaging application on the device that is being used. The user can also call back by swiping upward instead of pressing the button. A message from a messenger application would be handled in the same manner as a text message.

Figure 20B:
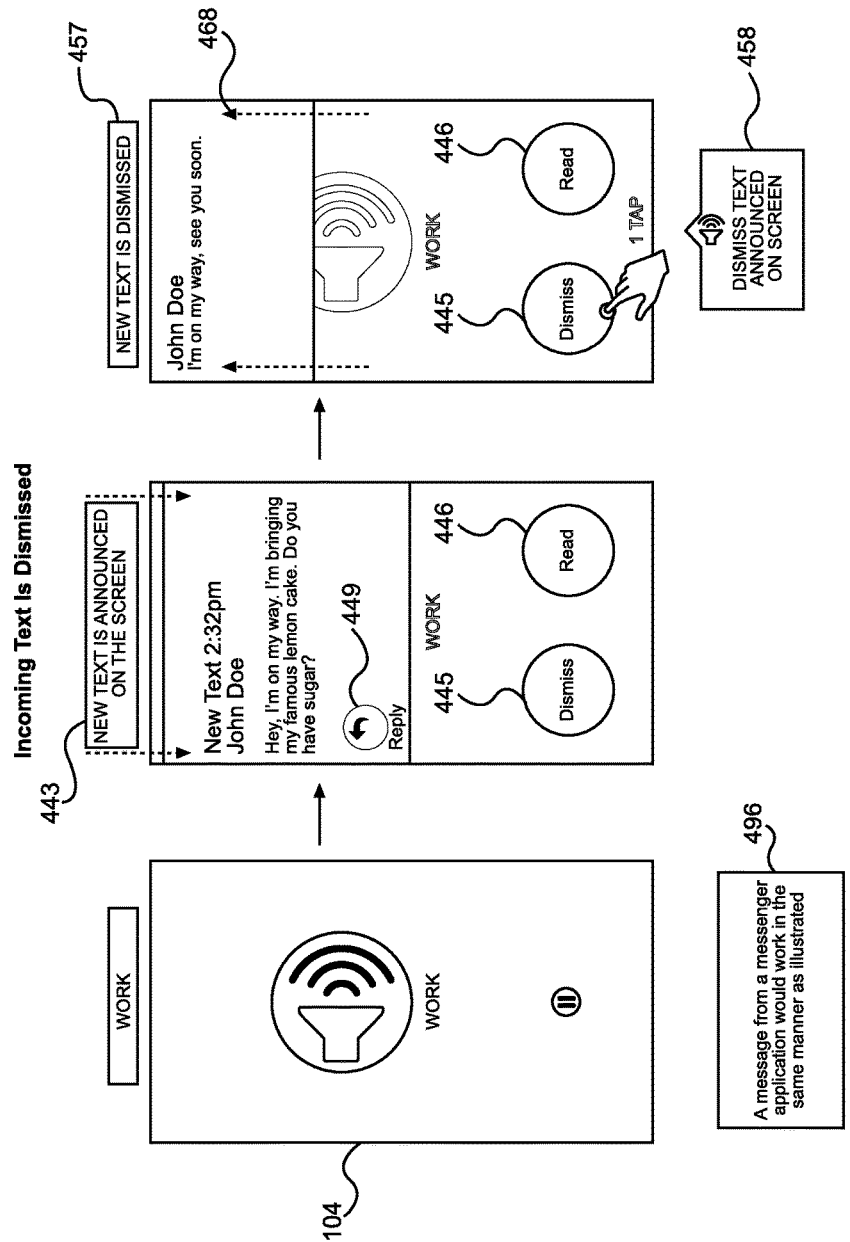
FIG. 20B illustrates dismissing of an incoming text message by a user. A message from a messenger application would work in the same manner.

FIG. 20B illustrates dismissing of an incoming text message by a user in Work Mode 203. After a new text message is announced 443 on the screen, the user presses the dismiss button 445, and the text message is dismissed 457. After dismissal, the textbox slides away as illustrated. The announcement in this case is limited to the name of the sender and the text of the message appears on the screen. A message from a messenger application would be handled in the same manner as a text message.

Figure 20C:
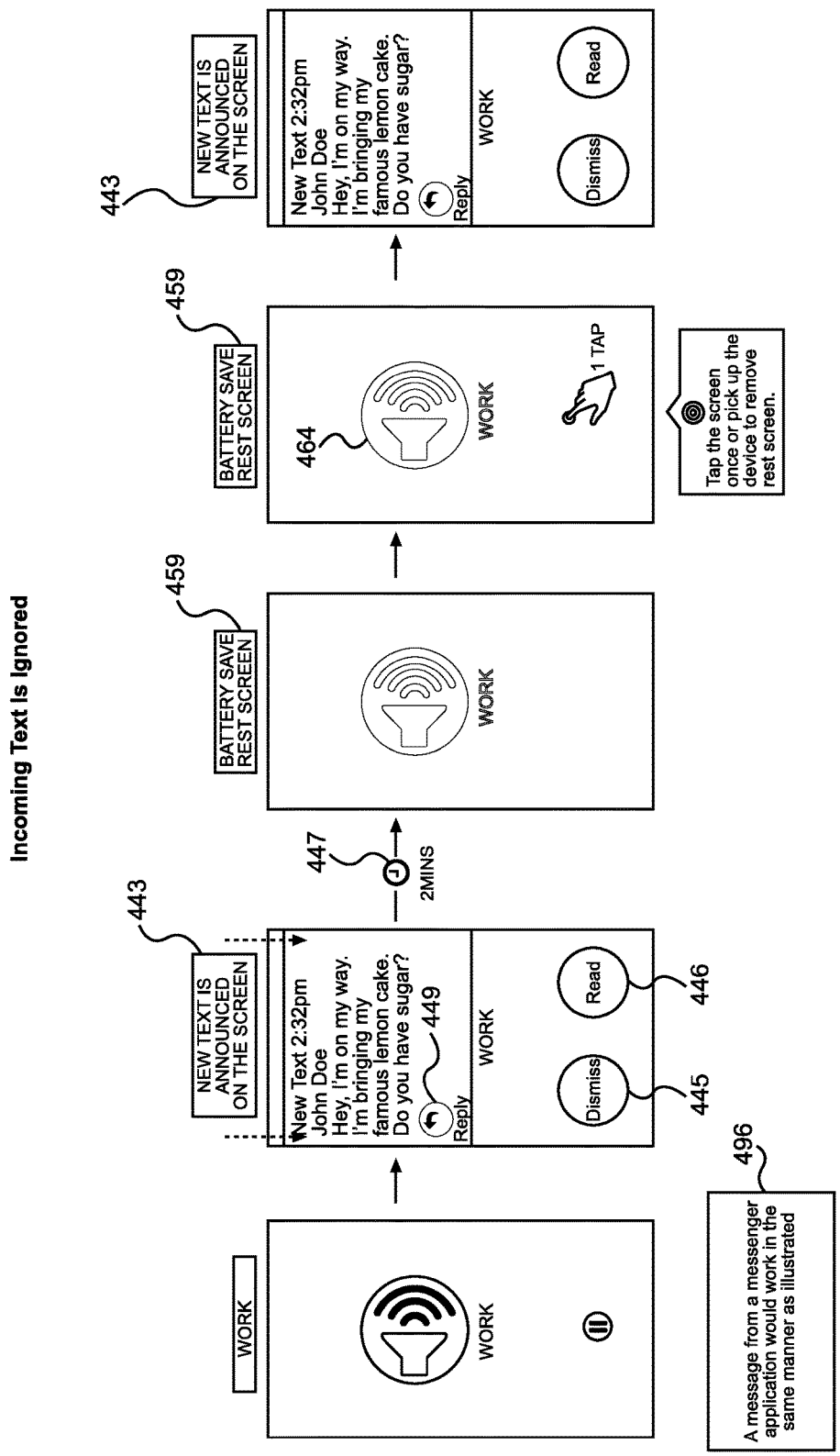
FIG. 20C illustrates the scenario in Work Mode when an incoming text message is ignored. A message from a messenger application would work in the same manner.

FIG. 20C illustrates the scenario in Work Mode 203 when an incoming text message is ignored. When a text message is announced 443 on the screen, the user has the choice to dismiss 445, read 446, or reply 449. If the user takes no action in the allotted time 447, then Work Mode 203 goes into the battery save rest screen, until the user taps 464 the screen. When the user taps the screen 464, the text that the user did not previously respond to by taking any action is announced again 443 on the screen. The announcement can be accompanied with a vibration/ping. A message from a messenger application would be handled in the same manner as a text message.

Figure 20D:
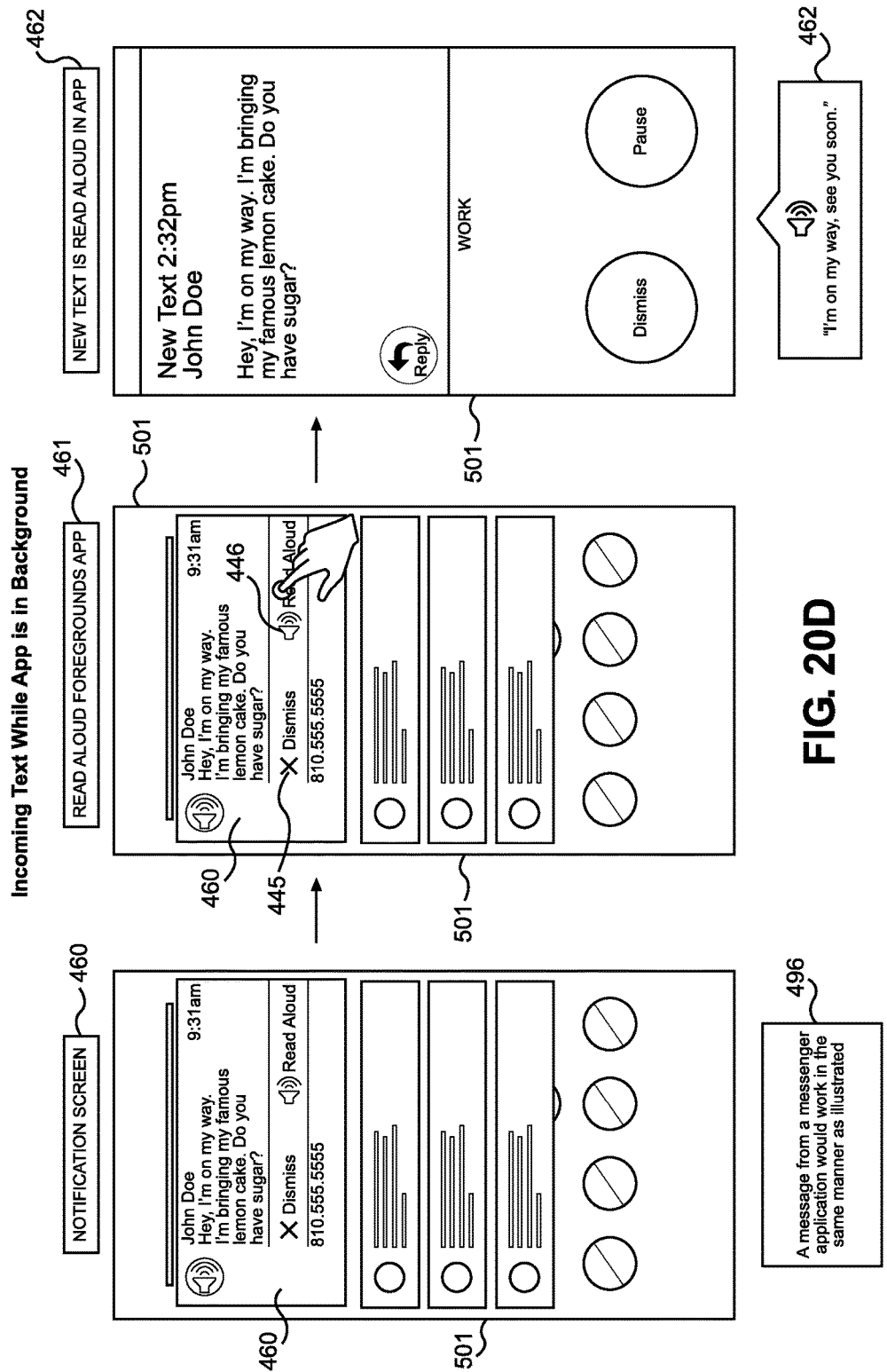
FIG. 20D illustrates when an incoming text message is received while Work Mode is in the background. A message from a messenger application would work in the same manner.

FIG. 20D illustrates when an incoming text message is received while the Work Mode 203 is in the background with other applications running in the foreground 501. The mobile phone or device of the user can have a notification screen 460 that depending on settings of the mobile device can be pulled down or automatically pops up. The user is provided with the options of a dismiss 445 and read aloud button 446. If the user presses on the read aloud button 446, then the work Mode 203 moves into the foreground, and the new text is read aloud 462.

Figure 21A:
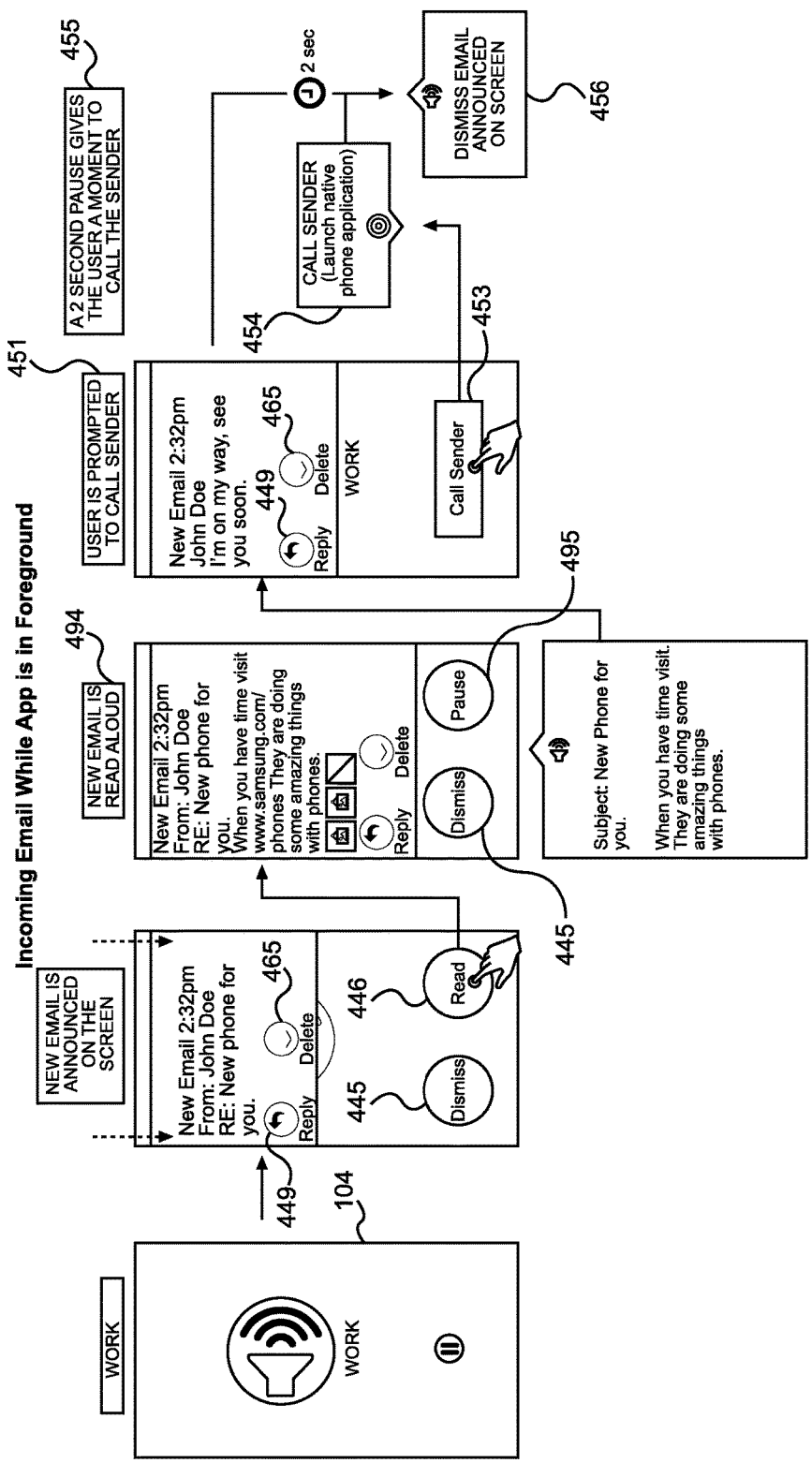
FIG. 21A illustrates the Work Mode when an incoming email arrives while the application is in the foreground.

FIG. 21A illustrates the Work Mode 203 when an incoming email arrives while the application is in the foreground. When an email message is received, the email message is announced 463. A user can decide whether or not to have announcements and emails be read out loud. In this case, the user's default is that announcements of the messages are read only on the screen 463. The announcement can be made with a vibration/ping. A user can dismiss the email by pressing the dismiss button 445 or have the application read aloud the email by pressing the read button 446. If the user does nothing, the application will not read the body of the email and will dismiss the message 456. After the body of the email is read 494, unless the user presses the dismiss 445 or reply 449 buttons, the application will then prompt the user to call the sender 451, 452, 453. If the user presses on the call sender 453 button, then the native phone application 454 of the device that is being used will be launched. If after a pause 455, the user takes no action the text is dismissed 456. At anytime during this process, a user can press the reply button 449 to open the native email application on the device that is being used. A message from a messenger application would be handled in the same manner as a text message.

Figure 21B:
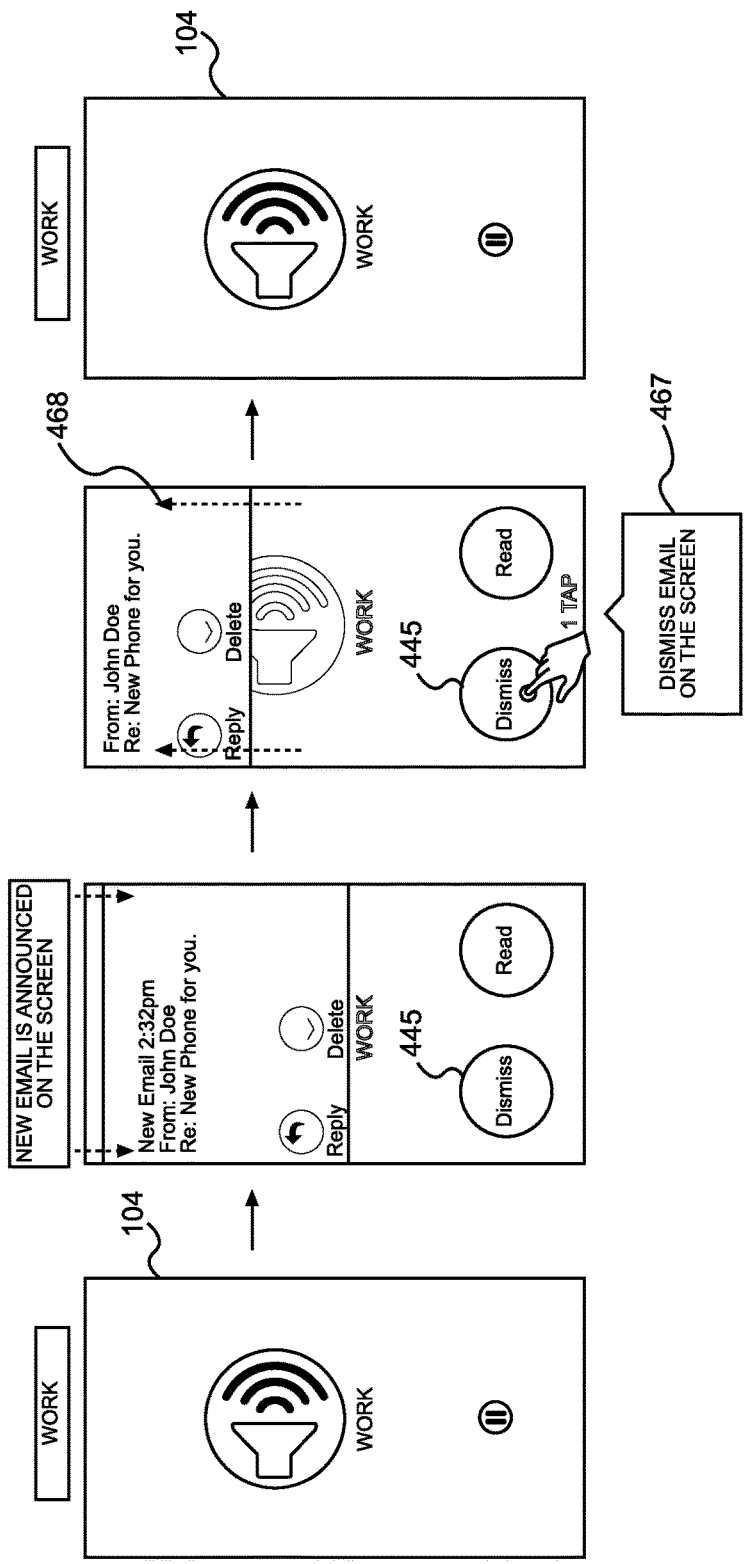
FIG. 21B illustrates dismissing of an incoming email by a user in Work Mode.

FIG. 21B illustrates dismissing of an incoming email by a user. After a new email is announced 463, the user presses the dismiss button 445, and the email is dismissed 467. The dismissal of the email can be read aloud 467. After dismissal, the textbox slides away 468 as illustrated.

Figure 21C:
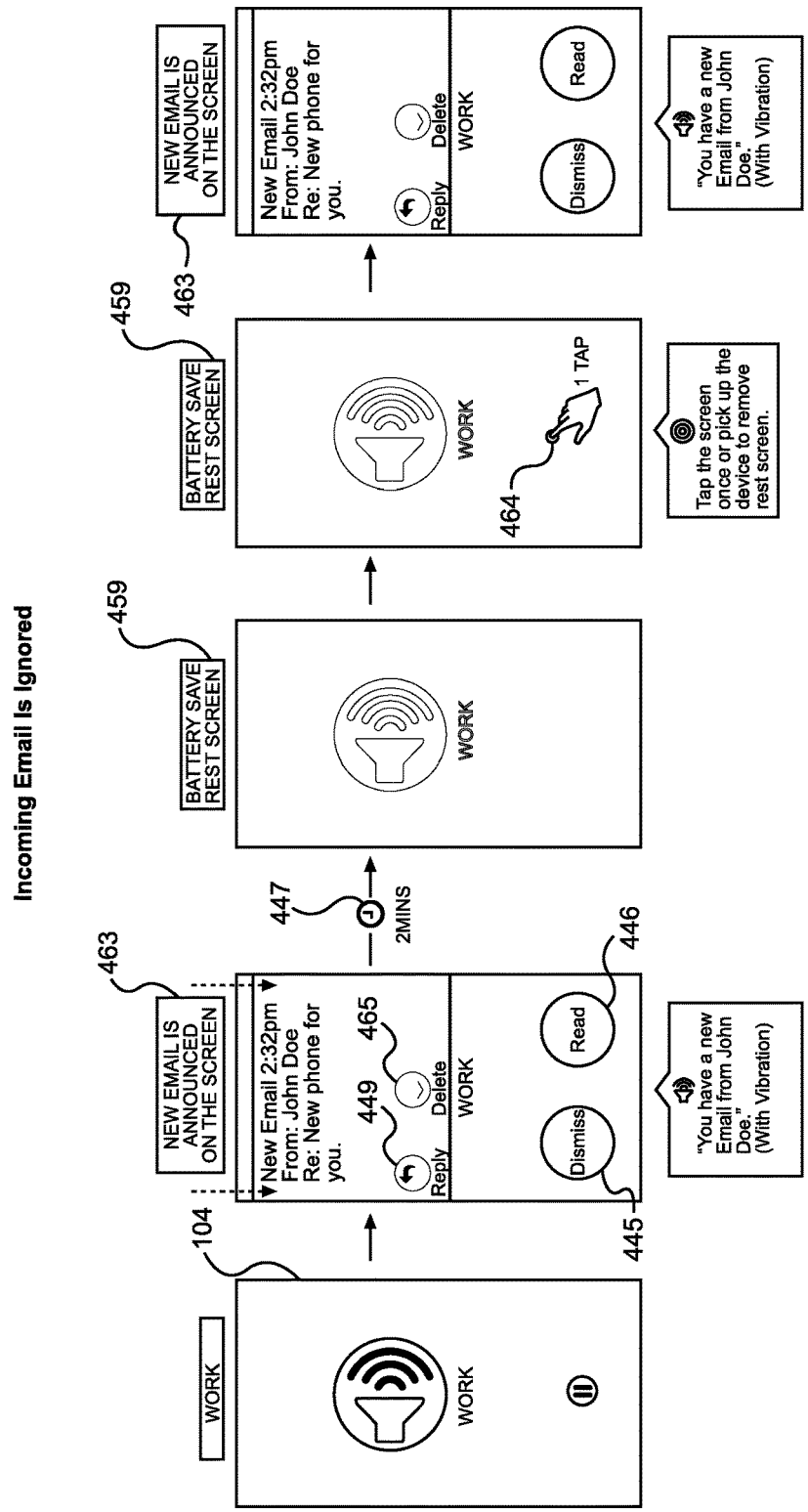
FIG. 21C illustrates the scenario in Work Mode when an incoming email is ignored.

FIG. 21C illustrates the scenario in Work Mode 203 when an incoming email is ignored. When an incoming email is announced 463 in Work Mode 203, the user has a choice to dismiss 445, read 446, reply 449, or delete 465 the new email. If the user takes no action in the allotted time 447, then Work Mode goes into the battery save rest screen 459 until the user taps 464 the screen. When the user taps the screen 464, the new email that the user did not previously respond to by taking any action is announced again 463.

Figure 21D:
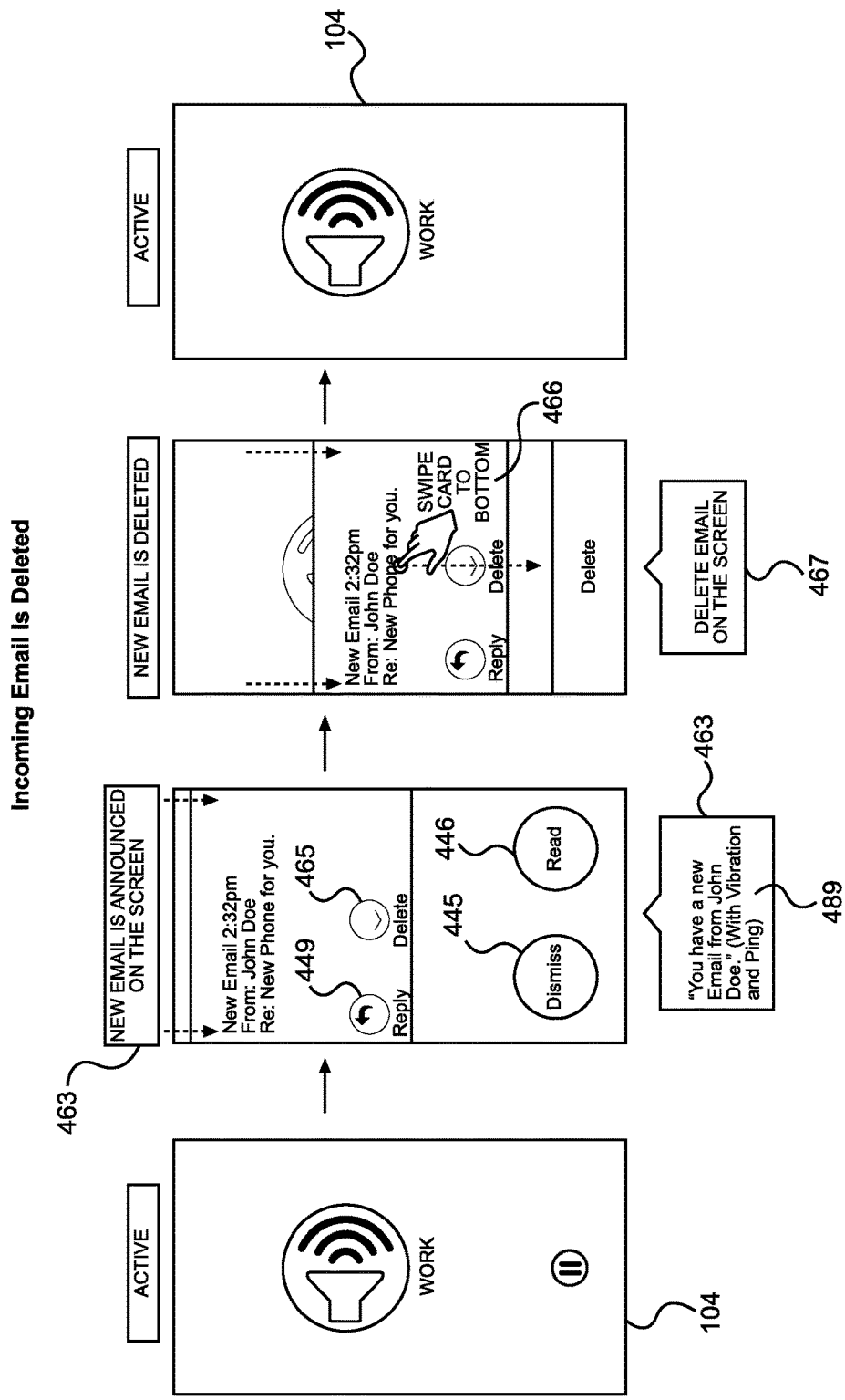
FIG. 21D illustrates when an incoming new email is deleted in Work Mode.

FIG. 21D illustrates when an incoming new email is deleted. After a new email is announced 463, the user swipes top to down 466 to delete the email. Alternatively a delete button 465 can be used. The application, depending on the setting, can inform the user aloud 467 that the new email has been deleted.

Figure 21E:
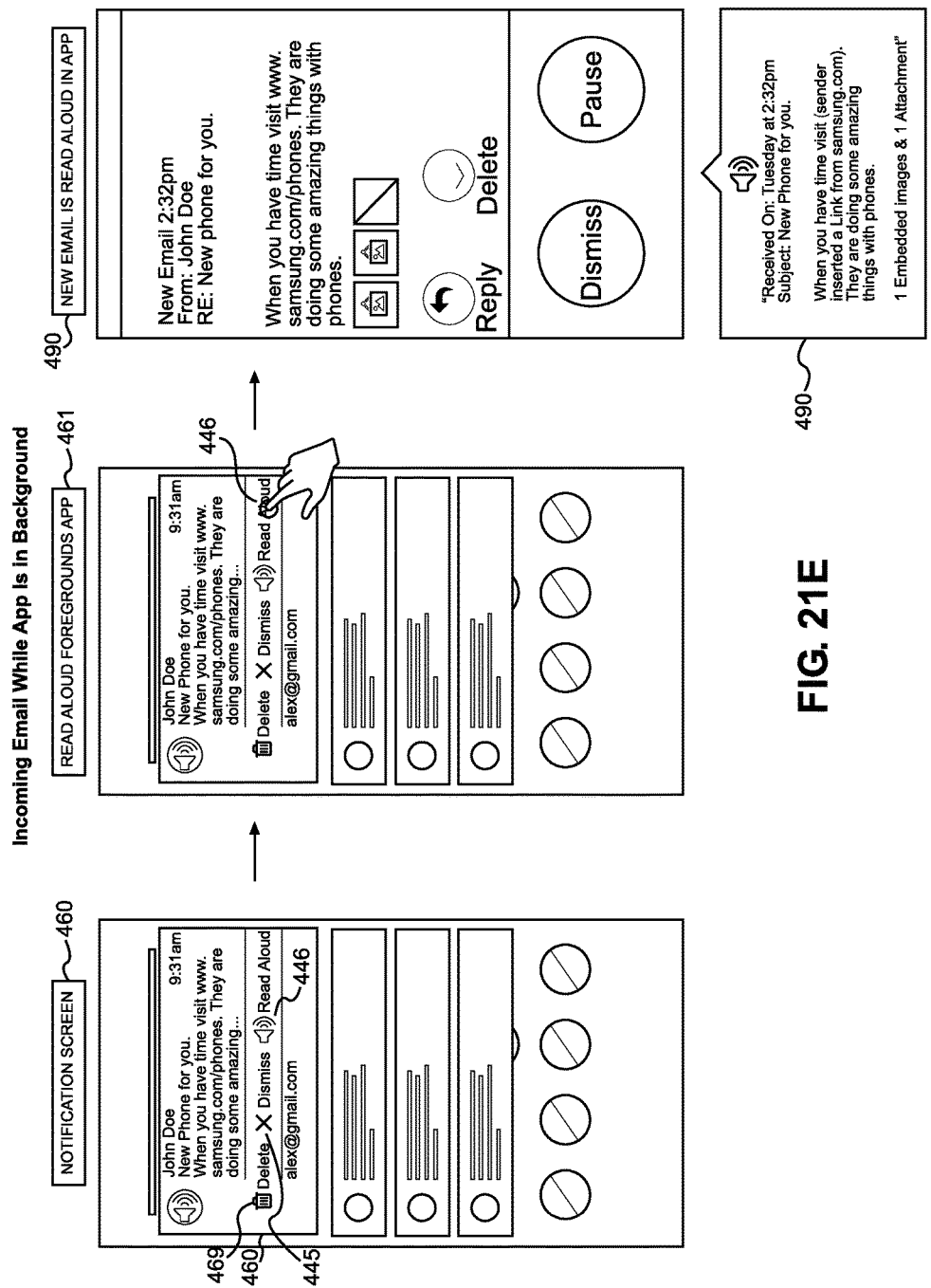
FIG. 21E illustrates when a new email is received while Work Mode is in the background.

FIG. 21E illustrates when a new email is received while the Work Mode 203 is in the background. The mobile phone or other device of the user can have a notification screen 460 that depending on settings of the device can be pulled down or automatically pops up. The user is provided with the options of a dismiss 445, read aloud button 446, and delete button 465. If the user presses on the read aloud button 446, then the Work Mode 203 moves into the foreground 461, and the new email is read aloud 490.

Figure 12:
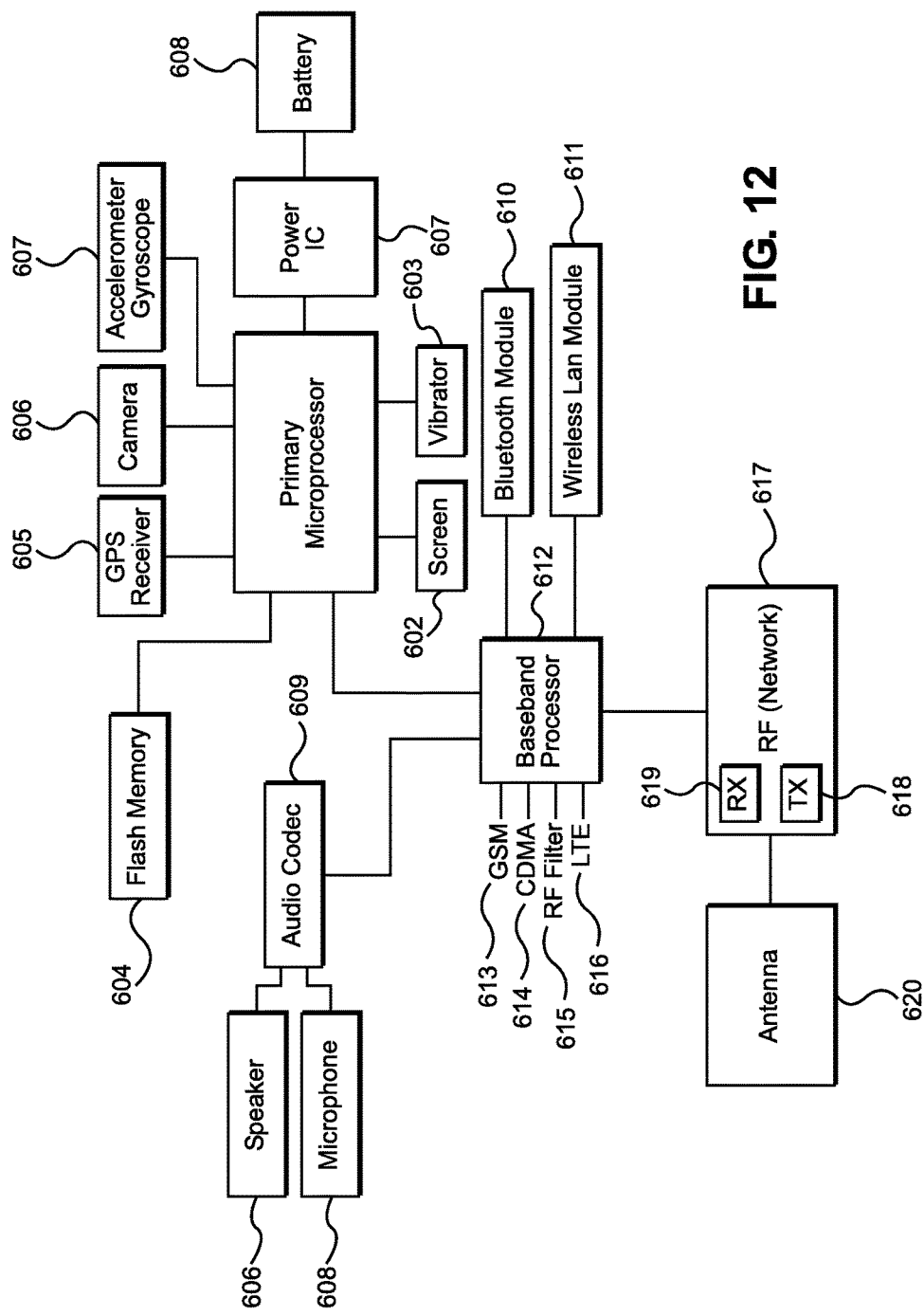
FIG. 12 illustrates components of a mobile phone.

FIG. 12 illustrates components a device on which the application operates. The device is typically a mobile or a smart phone, a mobile phone, but can also be a phablet, a tablet, wearable devices, watches, vehicle operating system/device. Depending on the device or system, the components may vary. For example, in a vehicle, the screen can be the same screen that is used by the vehicle's navigation system. The device can have a processor 601, a power control unit/manager 607, a power source such as a battery 608, a touch screen 602 configured for receiving input and displaying text/images, a speaker 606, a microphone 608, a memory 604, an Audio Codec 609, a Bluetooth module 610, a wireless LAN module 611, and a baseband processor 612. Communication can be carried out through a network capable of carrying out communication under one or more of GSM 613, CDMA 614, or LTE 616 (tower) protocols, or other multiple access technology protocols. The device can be configured to communicate with a mobile tower or a local wireless network (WiFi, LAN) 611. The baseband processor 612 can also have an RF filter 615 to filter out certain frequencies. The device can further be configured to have hardware, software or firmware for determining geographic-positioning location information, such as GPS or geolocation 605. The device can communicate with Radio Frequencies 617, and both transmit data 618 and receive data 619. The device can have an antenna 620. The device can further be configured to exchange data over short distances (such as 10 meters or less), such as with Bluetooth 610. For example, a user may send instruction to the device with a Bluetooth configured microphone and receive audio from the device with a Bluetooth configured speaker worn by the user and in Bluetooth communication with the device. The device can be configured to have additional components/functions, such as input keypad, accelerometer/gyroscope 607, camera 606, and an input port such as a USB port. The device can be configured, either with the main processor or with additional specialty processors, to process graphics, video, and digital signal processing (DSP). The device can further have a solid state or other type of storage, or may rely solely on flash memory for storage. The device can further have an operating system configured to run one or more applications.

Figure 22:
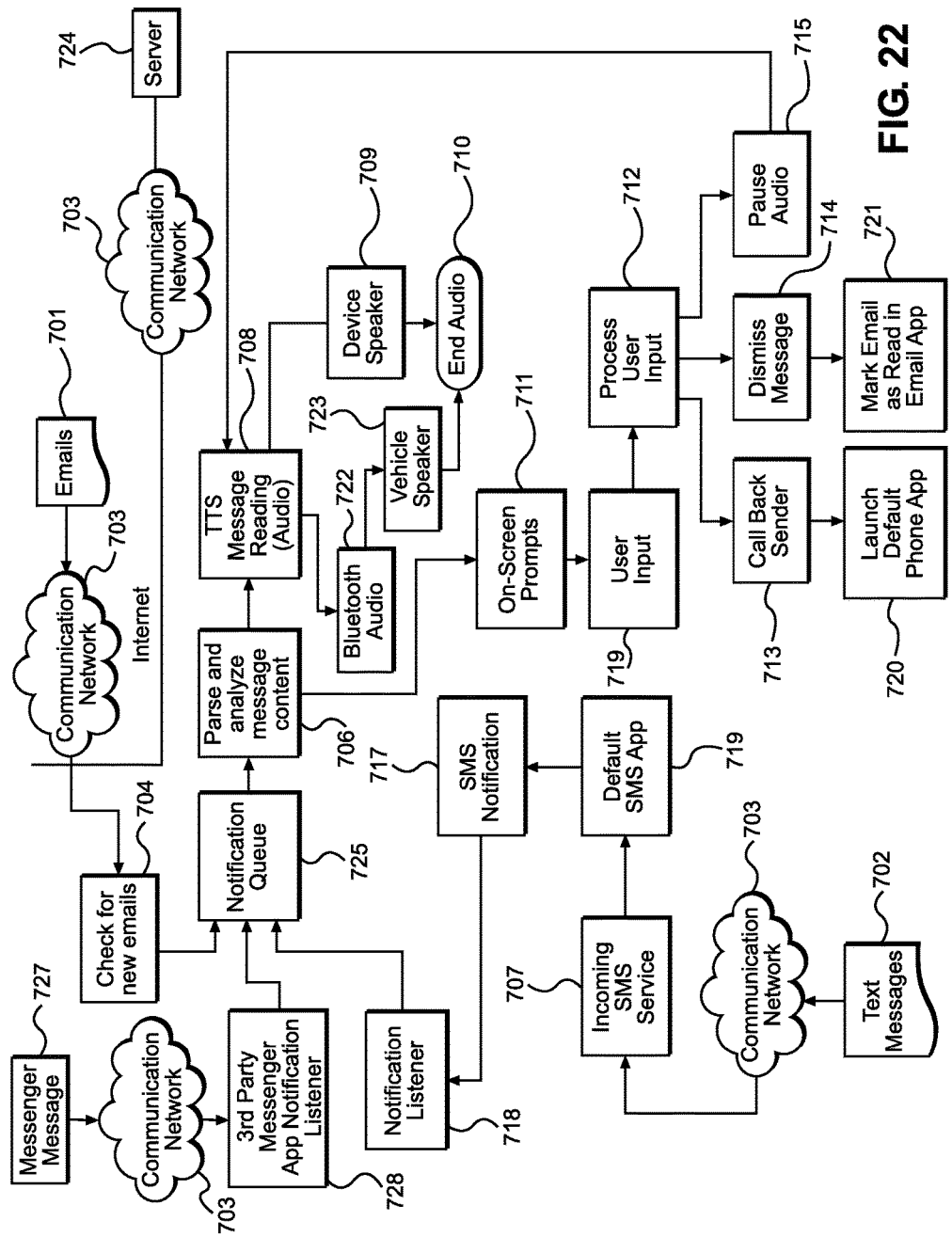
FIG. 22 is a flow chart illustrating the receipt, processing, and delivery of emails, text messages, and messages from a messenger application to a user.

FIG. 22 is a flow chart illustrating the receipt, processing, and delivery of emails 701, text messages 702, and messages from a messenger application 727 to a user. The emails 701, text messages 702, and messages from a messenger application 727 arrive to the mobile phone or other device via a communication network 703. The communication network 703 can that of a mobile carrier or an internet carrier (network). Internet Message Access Protocol (IMAP) can be used as an Application Layer Internet protocol to communicate with a remote mail server to access email 701. Text messages 702 may be communicated for example through the user's mobile carrier using. Short Message Service (SMS), which uses standardized communications protocols to allow mobile phone and other devices to exchange short text messages. The text message 702 can be limited to a number of characters. The message type can be one from a messenger service such as Facebook messenger, WhatsApp messenger, Skype messenger, Twitter Direct Messenger, Tango messenger, Viber Messenger, WeChat messenger, Instagram direct messenger, and iMessage (Apple chat). Messenger is an instant messaging service and software application which provides chat with a friend on devices that include a mobile device, such as a mobile phone. The messenger can be built for example on the open MQTT protocol.

Figure 25:
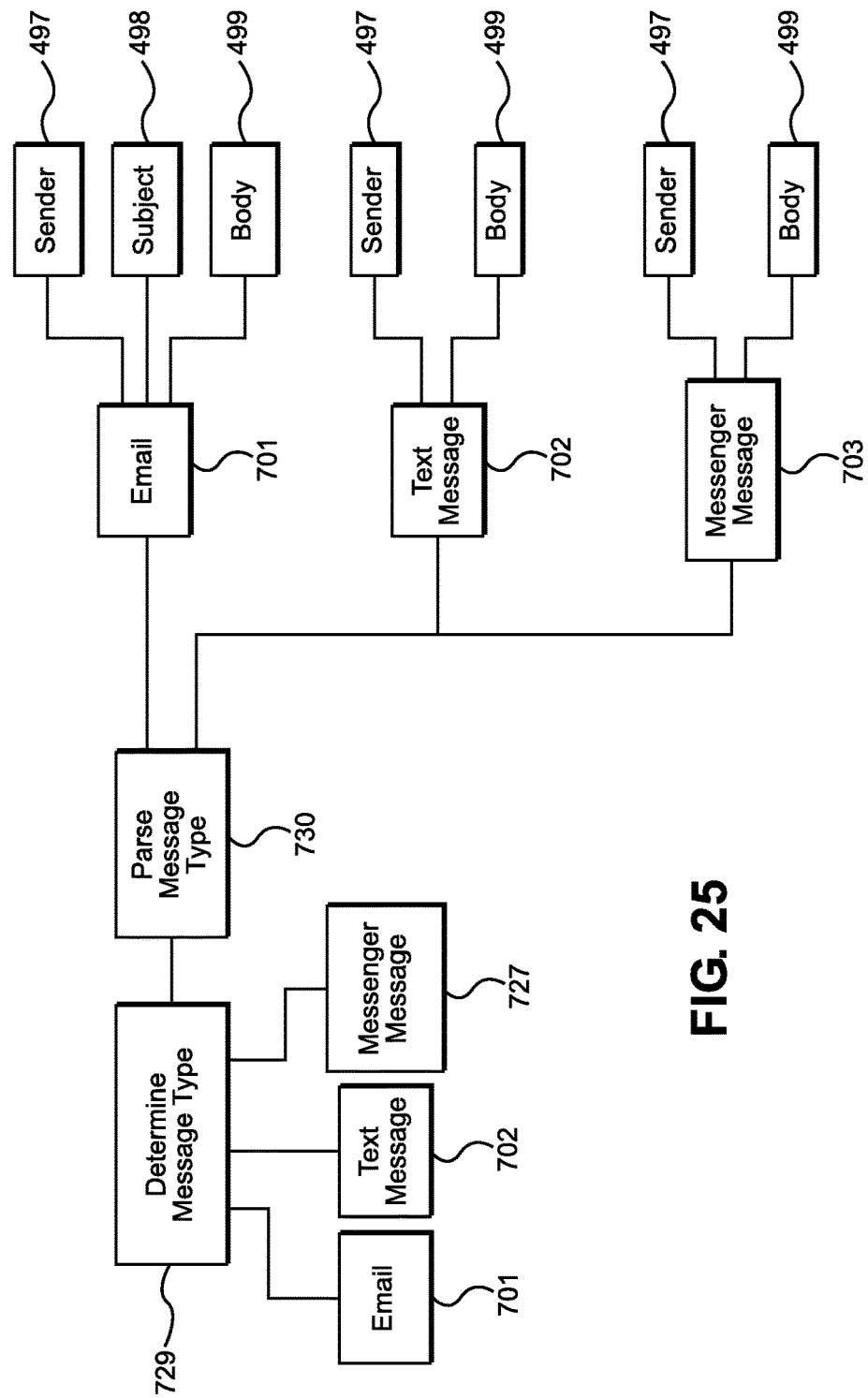
FIG. 25 illustrates analysis of different message types.

The application checks for new emails 704. The incoming SMS service 707 that is typically part of the operating system receives text messages delivered from to the user's mobile phone or other device from the communication network 703. The mobile phone's operating system delivers the messages to the default SMS application 719, after which an SMS notification is sent to the user 717. The application can have a notification listener 718 that checks for new text messages. In the same manner as text messages 702, messages from a messenger application 727 are delivered via communication network 703 to the use's device. A third party messenger notification listener 718 receives the messenger application and can send a notification of the messenger message 727. New text messages, emails, and messages from messenger can be placed in a queue 726. When a notification rises to the front of the queue, the notification queue 725 dispatches the notification of the queue to all observers. New text messages, emails, and messages from messenger applications can be processed by parsing and analyzing the message content 706. The analyzing/processing 706 can include the steps described in FIG. 25. A first determination can be made as to which message type is received 729, e.g., email 701, text message 702, and messenger message 727, The message type can then be parsed 730 according to sender 497, subject 498 (typically for emails only), and body 499. Additional analysis of the message can include date information, and attachment information. Typically emails 701 are parsed into sender 497, subject 498, and text body 499. Text messages 702 and messenger messages 727 are parsed into sender 497 and text body 499. If the application determines that the email or the text message needs to be read to the user, then the application carries out text to speech conversion 708. For example, the application can create a transcript of the portions or all of the message that it has processed, and covert the message to an audio file using TTS (text-to-speech) libraries. The audio file can be sent to the mobile phone's (or other device) default storage area. Typically, the application audio file is then played on the mobile phone's speaker 709, and then the audio is terminated 710 either by an action of the user or after completion. When the application processes the email or the text message 706, the application can prompt 711 the user on the screen to take certain actions, including calling back the sender 713, dismissing the message 714, and pausing audio 715. The user's inputs 719, such as swipes on the screen, are processed 712 and further action 720 may be taken by the application based on the user input 719. For example, the user input 719 can stop the application from playing the audio 715. If the user selects call back sender, the phone's native application for calling 720 makes the requested phone call. If a user dismisses a message 714, the email is mark as unread by the native email application 721. Steps 708 and 711 can happen simultaneously after processing 708. Step 708 can be repeated based on the user's input or after a delay afforded to the user. Playing of the audio can occur on the device speaker 709, or on a speaker of a networked speaker, for example a vehicle speaker 723 that is connected with Bluetooth 722. As illustrated in FIG. 22, the application runs on the device. An external server in communication with the device in which the application resides can control a user's account, gather data, and carry out other administrative tasks. Steps/modules 725, 706, 708, 711, 719, 712, 713, 714, 715, 720 and 721 are carried out on the messageLOUD application.

Figure 24:
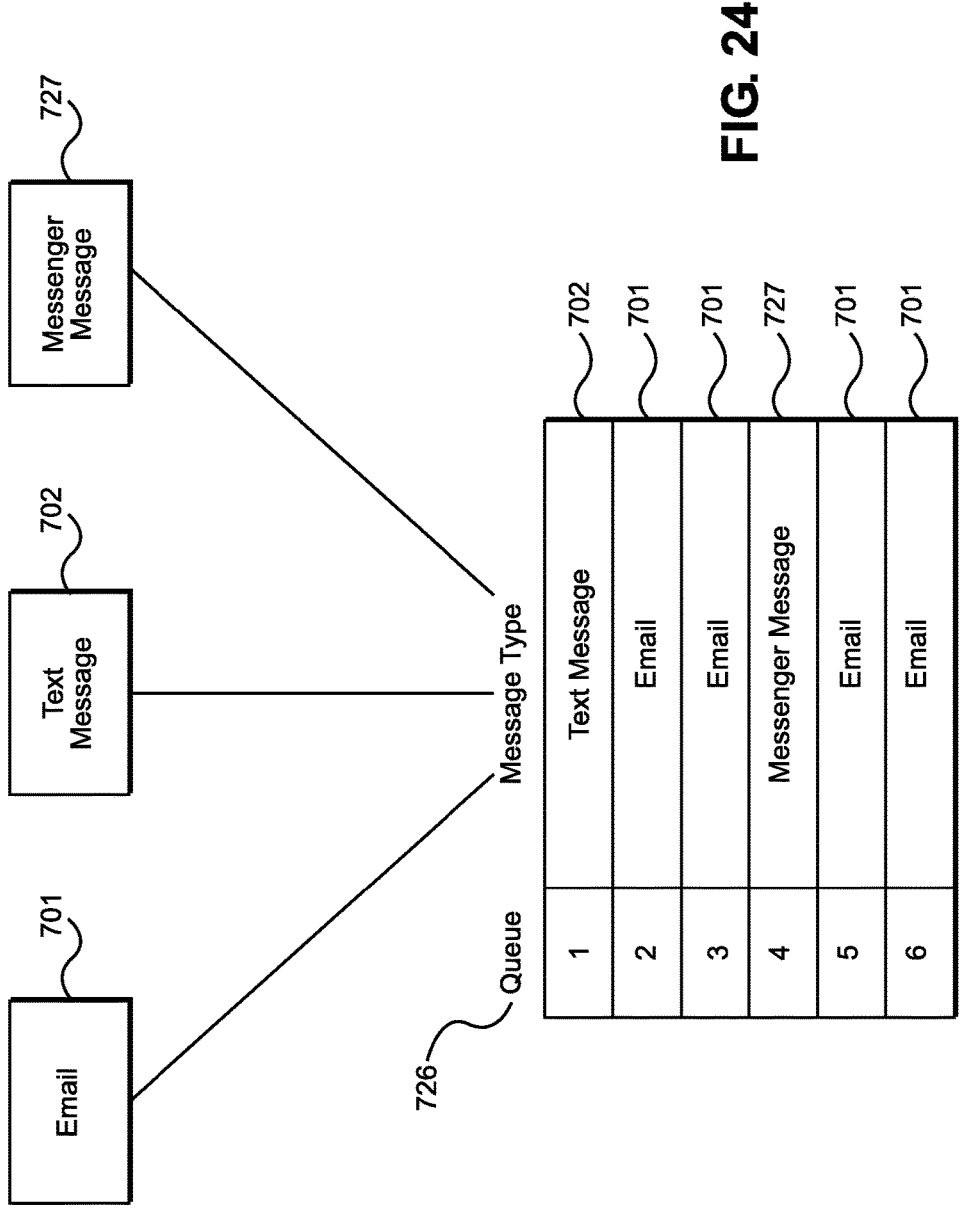
FIG. 24 illustrates different message types being placed in a queue based upon receipt time.

FIG. 24 illustrates different message types, emails 701, text messages 702, and messages from a messenger application 727, placed in a queue 726. The asynchronous messages received at different times are placed in a queue based on receipt time. The same queue 626 is used for all different message types. If the user is only receiving emails 701 and text messages 702, the queue 626 would only have those message types.

Figure 23:
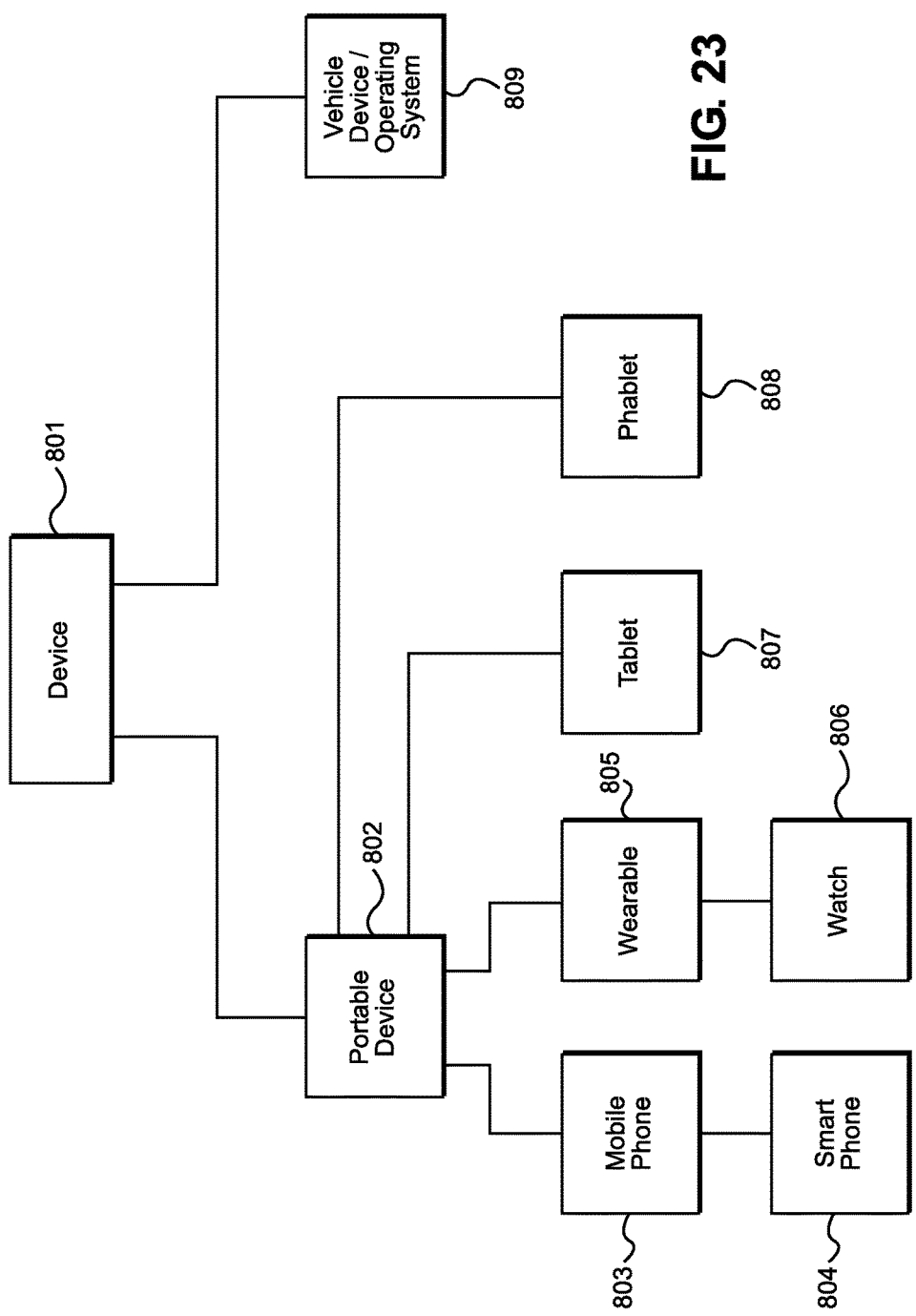
FIG. 23 illustrates that various devices that can run the messageLOUD® application for delivering one more message types.

FIG. 23 illustrates that various devices that can run the application. These include portable devices 802 such as mobile phones 803, smart phones 804, wearable devices 805, watches 806, tablet computers 807, phablets 808, and vehicle device/operating system 809. The vehicle is typically an automobile. A smart phone 804 is a type of a mobile phone 803, and is encompassed by a mobile phone.

FIGS. 7A, 7B, 7C, 11, 20A, 20B, 20C, and 20D are illustrated with a text message. A message from a messenger application would work in the same manner as illustrated for a text message in FIGS. 7A, 7B, 7C, 11, 20A, 20B, 20C, and 20D.

REFERENCES

100—Home screen
102—Application home page
103—Drive Mode screen
104—Work Mode screen
105—Active Mode screen
200—Other icons
201—Application (messageLOUD) icon
202—Drive Mode
203—Work Mode
204—Settings
205—Active Mode
206—Account Information
300—A user
400—"Drive Loud" announcement
401—New email is announced 402—Rule
403—Applied Rule
404—Applied Rule
405—Applied Rule
406—Name of sender is read aloud
407—Proceeding to next email
408—Pause
409—Swipe
410—Tapping
411—Read aloud
412—Pause
413 Delete email
414—Dismiss email
415, 416—Read aloud email body/subject
417—Actions by user during reading aloud
418—Pause/play message by tapping once
419—Pause button
420—Resume Work Button
421—Prompt to call sender
422—Asked aloud to call the sender
423—A pause
424—Call is made to sender
425—Swipe up
426—A pause
427—Text announcement
428—Text announcement aloud
429—Automatic Response
430—Pause
431—Dismiss text message
432—Receipt of subsequent text message
434—Hold to exit mode
435—Exit Mode button
436—Hold to exit mode
437—user is automatically exited
438—"Goodbye" aloud
439—"Work Loud"
440—Audio instructions in Work Mode
441—how to delete an email/Pause button
442—how to pause and resume (reread) reading/Resume Work button
443—How to call a sender
444—vibrate
445—dismiss button
446—read message button
447—pause
448—textbox slides away
449—reply button
450—text message read aloud
451—user is prompted to call sender
452—Textbox to ask user to call sender
453—call sender
454—native phone application
455—pause
456—the text message is dismissed
457—text message is dismissed
458—dismissal of text message can be read aloud
459—battery save rest screen
460—notification screen/user taps the screen
461—application moves into the foreground
462—new text is read aloud
463—email is read aloud
464—user taps the screen
465—delete button
466—user swipes top to down
467—application can inform the user aloud of dismissal
468—textbox slides away after dismissal
469—Application states "Active-Mode"
470—messageLOUD is now in Active Mode
471—User instructed how to delete emails
472—How to pause and resume reading
473—How to call a sender
474—application will read aloud "Active Loud"
475—user tapping
476—Active Paused
477—resume active
478—Text message is announced
479—message is read aloud
480—user is busy
481—A new text is announced
482—text is dismissed
483—email is announced
484—new email is read aloud
485—Long emails which overflow
486—Email is read aloud
487—scroll up
488—Attachments are displayed
489—Device can also vibrate
490—New email is read aloud in app
491—Incoming email is read aloud
492—user can pause or dismiss the text
493—touch the screen when idle to confirm you are still in Drive Mode
494—how to call the sender
495—Pause Button
496—Messenger working in same manner as a text message
497—Sender (can be phone number, name, nickname)
498—Subject
499—body
501—Applications in the foreground
601—processor
602—screen
603—vibrator
604—flash memory
605—GPS receiver
606—Camera
607—Accelometer/gyroscope
608—Microphone
609—Audio Codec
610—Bluetooth module
611—Wireless LAN module
612—Baseband processor
613—GSM (Global System for Mobile Communications)
614—CDMA (Code division multiple access)
615—RF Filter
616—LTE
617—RF
618—TX
619—RX
620—Antenna
701—Email
702—Text Messages
703—Communication Network
704—Checking for new emails
706—Parse and analyze message content (processing image)
707—Incoming SMS service
708—TTS (text-to-speech) message reading
709—Device speaker
710—End Audio
711—On-screen prompts
712—Process user input
713—Call back sender
714—Dismiss message
715—Pause audio 717—SMS notification
718—Notification Listener
719—Default SMS App
720—Launch Default Phone App
721—Marl Email as Read in Email App
722—Bluetooth
723—Vehicle Speaker
724—Server
725—Notification Queue
726—Queue
727—Messenger message
728—3rd party messenger app notification listener
729—Determine Message Type
730—Parse Message Type
801—Device
802—Portable Device
803—Mobile Phones
804—smart phones
805—wearable devices
806—watches
807—tablet computers
808—phablets
809—vehicle operating system/device

What is claimed is:

1. A computer implemented method to be carried out with a processor, a memory, and a touch screen, comprising: a) determining without any input by a user that two or more different types of messages selected from the group consisting of a text message, an email, and a message from a messenger application have been received; b) analyzing without any input by the user a content of the received text message, message from the messenger application, or email; c) placing the received email, message from the messenger application, or text message in a single queue to be read aloud in order of receipt time regardless of message type, wherein emails, messages from the messenger application, and text messages are read aloud one after another regardless of whether a next message in the queue is a new text message, a new message from the messenger application, or a new email; d) informing the user without any input by the user that the received text message, message from the messenger application, or email has been received from a sender by reading aloud at least an identity of the sender; e) allowing the user a time to take an affirmative action to stop reading a body of the received text message, message from the messenger application, or email aloud to the user; and f) based on not receiving an input corresponding to the affirmative action from the user, reading aloud the body of the received text message, message from the messenger application, or email.

2. The computer implemented method of claim 1, wherein analyzing the content comprises parsing the email into a subject, the sender, and the body, and parsing the text message or the message from the messenger application into the sender and the body.

3. The computer implemented method of claim 1, wherein the computer implemented method is carried out with an application that is configured to run in a foreground or in a background, and is further configured to switch back and forth between the foreground and the background, and is further configured to read aloud the identity of the sender, and the body of the received email, text message, or message from the messenger application while the application is in the background.

4. The computer implemented method of claim 1, further comprising prompting the user to call the sender without any input from the user.

5. The computer implemented method of claim 1, wherein a different interface is presented on the touch screen depending on an activity of the user.

6. The computer implemented method of claim 5, wherein the activity is driving a vehicle.

7. The computer implemented method of claim 5, wherein the activity is working with a desktop, a laptop, or a tablet computer.

8. The computer implemented method of claim 5, wherein the activity is exercise (Active Mode).

9. The computer implemented method of claim 1, wherein informing the user comprises reading aloud a name of the sender.

10. The computer implemented method of claim 1, wherein step (f) comprises, based on receiving the input corresponding to the affirmative action from the user, not reading aloud the body of the received text message, message from the messenger application, or email to the user.

11. The computer implemented method of claim 1, wherein the method is carried out with a smart phone.

12. The computer implemented method of claim 1, further comprising receiving an input from the user after step e without the user looking at the touch screen.

13. The computer implemented method of claim 1, further comprising displaying an interface on the touch screen with no prompts for the user to touch.

14. The computer implemented method of claim 1, further comprising receiving an input from the user after step e based on a gesture by the user.

15. The computer implemented method of claim 14, wherein the input from the user is limited to tapping or swiping the touch screen without a need to look at the touch screen.

16. The computer implemented method of claim 1, further comprising informing the user by voice of an option to call the sender.

17. The computer implemented method of claim 16, further comprising, based on receiving an input from the user to call the sender, calling the sender.

18. The computer implemented method of claim 1, wherein informing the user comprises informing the user of the identity of the sender and the subject of the received email, or the identity of the sender of the received text message or the message from the messenger application.

19. The computer implemented method of claim 1, wherein after reading aloud the received email, text message or message from the messenger application, the received email, text message or message from the messenger application is automatically dismissed and a status of the received email, text message or message from the messenger application is changed to read.

20. The computer implemented method of claim 19, wherein after the received email, text message or message from the messenger application is read aloud and the status changed to read, the user is notified that a new email, text message, or message from the messenger application has been received.

21. The computer implemented method of claim 1, wherein the reading aloud is carried out by an audio system in a vehicle.

22. The computer implemented method of claim 1, wherein the input from the user is limited to a) pausing or rereading the reading of the received email, text message or message from the messenger application; b) dismissing the received email, text message, or message from the messenger application; c) deleting the received email; and d) calling the sender.

23. The computer implemented method of claim 1, wherein the method is carried out on a device selected from the group consisting of: a smart phone, a mobile phone, a phablet, a tablet, a wearable device, a watch, and a vehicle operating device.

24. A mobile phone, comprising: one or more processors; a memory, a touch screen; and one or more programs, wherein the one or more programs are stored in the memory and configured to be executed by the one or more processors, the one or more programs including instructions for steps comprising: a) determining without any input by a user that two or more different types of messages selected from the group consisting of a text message, an email, and a message from a messenger application have been received; b) analyzing without any input by the user a content of the received text message, message from the messenger application, or email; c) placing the received email, message from the messenger application, or text message in a single queue to be read aloud in order of receipt time regardless of message type, wherein emails, messages from the messenger application, and text messages are read aloud one after another regardless of whether a next message in the queue is a new text message, a new message from the messenger application, or a new email; d) informing the user without any input by the user that the received text message, email, or message from the messenger application has been received from a sender by reading aloud at least an identity of the sender; e) allowing the user a time to take an affirmative action to stop reading a body of the received text message, message from the messenger application, or email aloud to the user; and f) based on not receiving an input corresponding to the affirmative action from the user, reading aloud the body of the received text message, message from the messenger application or email, and for the received email, further reading aloud a subject of the received email.

25. A system for delivering one or more of a text message and an email and a message from a messenger application to a user engaged in an activity, the system comprising a processor, a memory, and a touch screen, the system configured to deliver the text message, the message from the messenger application, and the email to the user by: a) running an application configured to deliver one or more of a text message, an email, or a message from the messenger application to a user while the user is engaged in an activity; b) determining without any input by the user that two or more different types of messages selected from the group consisting the text message, the email, and the message from the messenger application have been received; c) placing the received email, message from the messenger application, or text message in a single queue to be read aloud in order of receipt time regardless of message type, wherein emails, messages from the messenger application, and text messages are read aloud one after another regardless of whether a next message in the queue is a new text message, a new message from the messenger application, or a new email; d) analyzing without any input by the user a content of the received text message, message from the messenger application, or email; e) informing the user without any input by the user that the received text message, message from the messenger application, or email has been received from a sender by reading aloud at least an identity of the sender; f) allowing the user a time to take an affirmative action to stop reading a body of the received text message, message from the messenger application, or email aloud to the user; and g) based on not receiving an input corresponding to the affirmative action from the user, reading aloud the body of the received text message, message from the messenger application, or email, and for the received email, further reading aloud a subject of the received email.

\* \* \* \* \*